United States Patent
Litke et al.

(10) Patent No.: US 6,603,473 B1
(45) Date of Patent: Aug. 5, 2003

(54) DETAIL DATA PERTAINING TO THE SHAPE OF AN OBJECT SURFACE AND RELATED METHODS AND SYSTEMS

(75) Inventors: Nathan Jacob Litke, Pasadena, CA (US); Adi Levin, Ganey Tikva (IL); Peter Schroeder, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 240 days.

(21) Appl. No.: 09/833,267

(22) Filed: Apr. 11, 2001

Related U.S. Application Data

(60) Provisional application No. 60/196,663, filed on Apr. 12, 2000.

(51) Int. Cl.$^7$ .............................................. G06T 17/00

(52) U.S. Cl. ...................................... 345/420; 345/423

(58) Field of Search ................................. 345/420, 423

(56) References Cited

PUBLICATIONS

Biermann, H., et al., *Piecewise Smooth Subdivision Surfaces with Normal Control*; New York University and Tel Aviv University; pp. 113–120.

Levin, Adi, *Combined Subdivision Schemes*; Tel Aviv University, The Raymond and Beverly Sackler Faculty of Exact Sciences, School of Mathematical Sciences, Mar. 2000, pp. 1–259.

Levin, Adi, *Interpolating Nets of Curves By Smooth Subdivision Surfaces*; Tel Aviv University; pp. 57–64.

Loop, Charles Teorell., *Smooth Subdivision Surfaces Based on Triangles*, Department of Mathematics, University of Utah, Aug. 1987 pp. 1–72.

*Primary Examiner*—Mark Zimmerman
*Assistant Examiner*—Lance W. Sealey
(74) *Attorney, Agent, or Firm*—Howrey Simon Arnold & White, LLP

(57) ABSTRACT

A method of forming detail data corresponding to a vertex of a polygonal mesh representation of an object surface. The mesh representation has a limit surface, and the vertex has a limit point on the limit surface. The detail data for the vertex relates to the shape of the limit surface near the limit point corresponding to the vertex, and may capture detail about the object surface which is not captured by the mesh representation. The method may involve forming difference or detail data for one or more vertices from the group comprising the vertex in question and one or more neighboring vertices, weighting the resulting difference or detail data with prescribed weights, and deriving the detail data for the vertex in question from the weighted difference or detail data. The difference data for a vertex is the difference between the vertex as mapped onto the object surface and the limit point for the vertex on the limit surface.

35 Claims, 19 Drawing Sheets

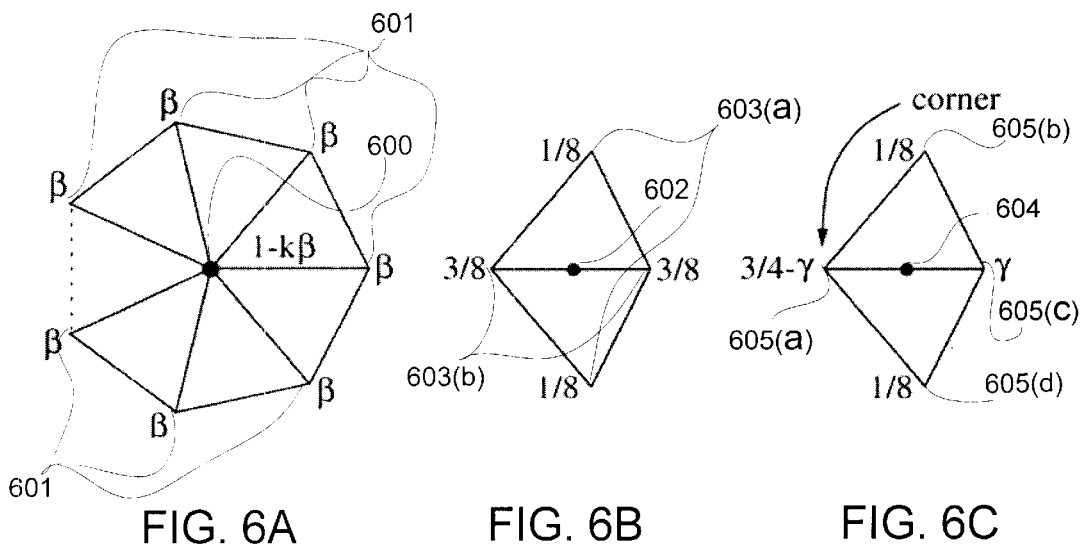
FIG. 6A    FIG. 6B    FIG. 6C
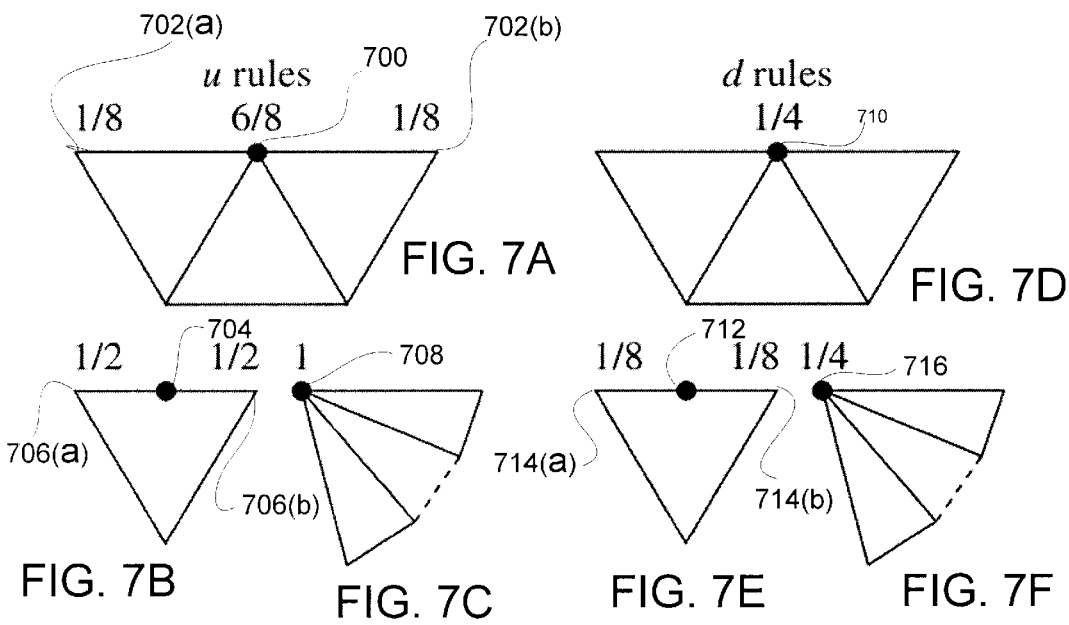
FIG. 7A    FIG. 7D
FIG. 7B    FIG. 7C    FIG. 7E    FIG. 7F

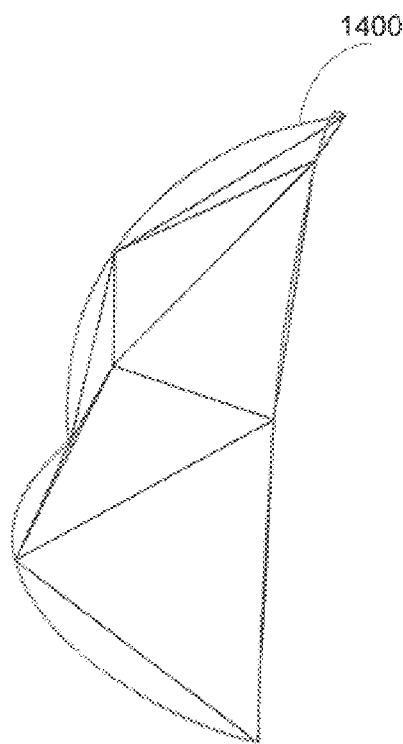
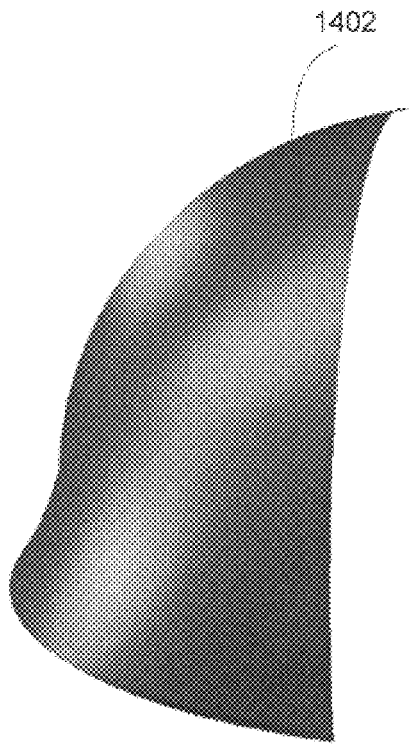
FIG. 14A  FIG. 14B
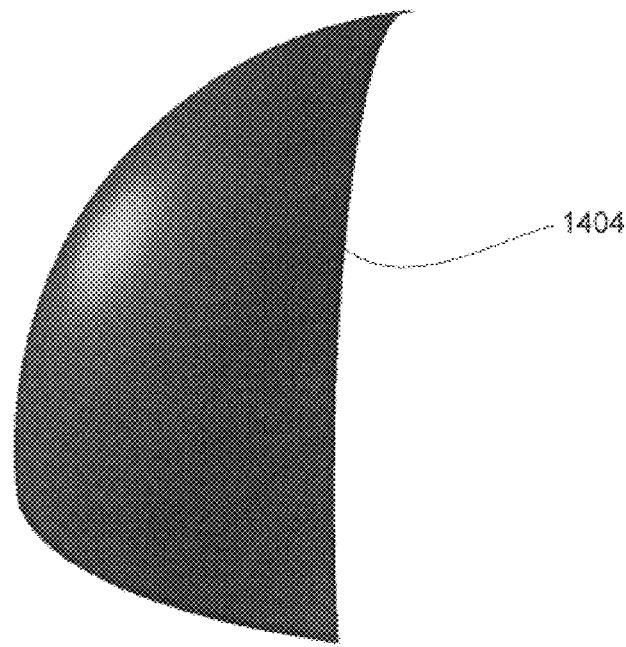
FIG. 14C

DETAIL DATA PERTAINING TO THE SHAPE OF AN OBJECT SURFACE AND RELATED METHODS AND SYSTEMS

This application claims the benefit of U.S. Provisional Application No. 60/196,663, filed Apr. 12, 2000, which is hereby incorporated by reference herein as though set forth in full.

The U.S. Government has certain rights in this invention pursuant to Grant Numbers ACI-9721349 and DMS-9874082 awarded by the National Science Foundation.

BACKGROUND OF THE INVENTION

1. Field of the Invention

This invention relates generally to the field of object modeling, and, more specifically, to detail data relating to the shape of an object surface.

2. Related Art

In the area of computer aided geometric design (CAGD), an object surface is sought to be manufactured from a representation of the object surface. Because the manufactured surface is often subject to very tight tolerances, it is critical that the object representation be as accurate as possible. Unfortunately, for several reasons, current object modeling techniques, such as tensor product NURBS (non-uniform rational B-splines), are often unable to achieve the required numerical precision.

First, NURBS methods can represent surfaces of arbitrary topology only by partitioning the object representation into a collection of individual NURBS patches. Adjacent patches must then be explicitly stitched together using geometric continuity conditions. This requires careful patch layout and cumbersome cross boundary continuity management to build complex shapes. This practice is particularly cumbersome in computer animation, where it often leads to the appearance of kinks and cracks, especially when such patch complexes are animated.

A second problem with NURBS is in the context of trimming operations, that is, operations in which an object representation is cut along a prescribed border or trim curve to, for example, insert a rivet hole. To trim a NURBS patch, the specified area in the representation to be trimmed is typically not altered. Instead, the specified area bounded by the trim curve is represented in the parametric domain. This parametric representation of the bounded area is then retained during the manufacturing process to ensure that the prescribed area is left unfilled. Unfortunately, a parametric representation of a trim curve is often prohibitively difficult to achieve with precision. Consequently, topological inconsistencies such as cracks are often introduced.

Subdivision surface modeling, in which an object surface is modeled as a mesh of polygons such as triangles, provides a means for modeling objects of arbitrary topology that may include both smooth curved surfaces and sharp edges. Unlike NURBS, the technique does not require the use of separate patches or the enforcement of continuity conditions. Therefore, subdivision surface modeling has been increasingly adopted in high-end animation production and game engines and are provided as primitives in many popular modeling programs (e.g., Maya, Mirai, 3D Studio Max, Lightwave, etc.).

However, for many CAGD applications, subdivision surface modeling does not currently provide the necessary numerical exactness. Moreover, current trimming operations performed on such models frequently introduces unacceptable distortion, either because the operation does not guarantee substantially exact reproduction of the trim curve, or because the operation introduces unacceptable distortion in the area around the trim curve. The failure to reproduce the trim curve in the operation is especially problematic because it frequently introduces topological inconsistencies such as cracks during tessellation.

3. Related Applications

This application is being filed concurrently with U.S. patent application Ser. No. To Be Determined, Howrey Dkt. No. 01339.0005.00US01, entitled "METHOD OF TRIMMING A REPRESENTATION OF AN OBJECT SURFACE COMPRISING A MESH OF TESSELLATED POLYGONS AND RELATED SYSTEM," and U.S. patent application Ser. No. To Be Determined, Howrey Dkt. No. 01339.0005.NPUS02, entitled "OBJECT SURFACE REPRESENTATION AND RELATED METHODS AND SYSTEMS," both of which are owned in common by the assignee hereof, and both of which are hereby fully incorporated by reference herein as though set forth in full.

SUMMARY

The present invention provides a method for determining detail data relating to the shape of an object surface. In one application, the detail data may be used to augment a representation of an object surface comprising a tessellated mesh of subdivided or repeatedly subdivided polygons. The detail data provides information about the object surface which may not be captured by the polygonal mesh. By augmenting the mesh representation with this detail data, a more accurate representation of the object surface results.

In one embodiment, the detail data comprises a plurality of detail vectors which are each associated with one of the vertices of the polygonal mesh. Each polygon in the mesh may have one or more vertices, and, in one embodiment, may have three or more vertices. The detail vectors may also be associated with any of the vertices in the hierarchy of meshes produced by subdivision. A detail vector affects the shape of the surface near the limit point corresponding to the vertex. The limit surface results by subdividing the mesh representation of the object surface infinitely. The limit point of a vertex is the point on the limit surface that the vertex converges to.

In one example, the detail vector for a vertex is determined by first producing difference vectors for the vertex in question as well as vertices in the neighborhood of the vertex in question. A difference vector for a vertex is the vector formed from the difference between the vertex as mapped onto the original object surface, and the limit of the vertex. These difference vectors are then weighted using a set of prescribed weights, and the results summed to arrive at the detail vector for the vertex in question.

In a second example, a detail vector for a vertex is produced by first determining the difference vector for that vertex, and then weighting that difference vector by a prescribed weight to arrive at the detail vector for the vertex in question. Difference vectors for other vertices in the neighborhood of the vertex in question are not utilized in this example.

In yet another example, the detail vector for a vertex is produced by first determining detail vectors for vertices adjacent to the vertex in question. These detail vectors are then weighted using prescribed weights, and the results added to arrive at the detail vector for the vector in question.

In one embodiment, the prescribed weights are embodied in the form of predetermined stencils which are selected and applied based on the vertex type, the valence, and the level of subdivision involved. In one implementation, a stencil may be an interpolating stencil or a quasi-interpolating stencil. An interpolating stencil is one that provides an approximation that exactly matches the data being approximated. A quasi-interpolating stencil is one that is interpolating up to a certain polynomial degree, in this case, cubic. In one implementation example, the method selects a quasi-interpolating stencil for all vertices which are interior vertices at level j=0 in the hierarchy; interior vertices of valence six at levels j>0 in the hierarchy; boundary vertices; and corner vertices (which are a species of boundary vertices). In this implementation example, for interior vertices having valences other than six which are located at levels j>0 in the hierarchy, the method selects an interpolating stencil.

In this implementation example, for all interior vertices at level j=0, and all interior vertices at levels j>0 having a valence of six, the method applies a stencil which, in effect, weights the difference vector for the vertex in question, as well as several neighboring vertices, by prescribed weights, and sums the results to arrive at the detail vector for the vertex in question.

In this implementation example, for all interior vertices at level j>0 having a valence other than six, the method applies a stencil which, in effect, weights the difference vector for the vertex in question by a prescribed weight to arrive at the detail vector for that vertex.

For all non-corner boundary vertices in this implementation example, the method applies a stencil which, in effect, weights the difference vectors for several neighboring vertices by prescribed weights, and sums the results to arrive at the detail vector for the vertex in question.

For corner vertices in this implementation example, the method applies a stencil which, in effect, weights the detail vectors of adjacent vertices by prescribed weights, and adds the results to arrive at the detail vector for the vertex in question.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIGS. 6A–6C illustrate one embodiment of the stencils used to determine the locations of interior vertices in the finer mesh.

FIGS. 7A–7C illustrate one embodiment of the stencils used to determine the parameters of boundary and corner vertices in the finer mesh.

FIGS. 7D–7F illustrate one embodiment of the stencils used to propagate boundary detail vectors to the finer mesh.

FIGS. 14A–14C illustrate one use of interior detail vectors.

DETAILED DESCRIPTION

I. Surface Representation

Figure 1A:
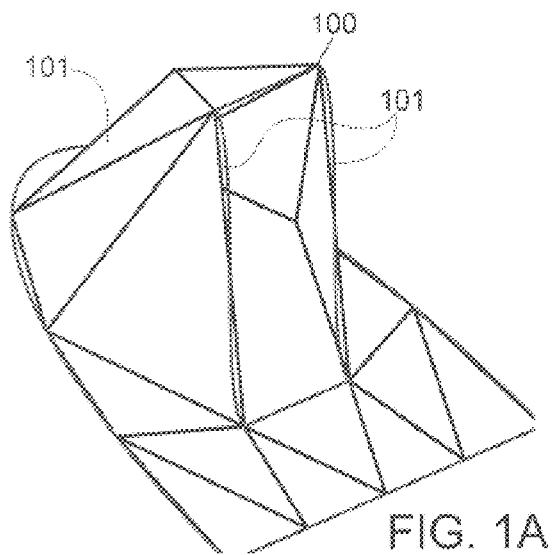
FIGS. 1A–1D illustrate the process of representing a three-dimensional object as a plurality of tessellated polygonal meshes.
Figure 1B:
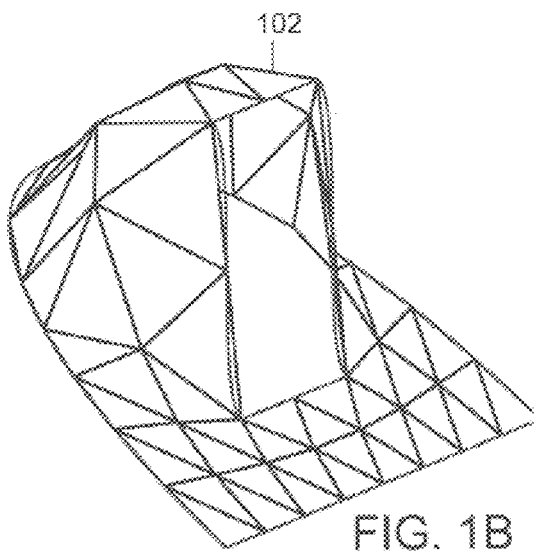
Figure 1C:
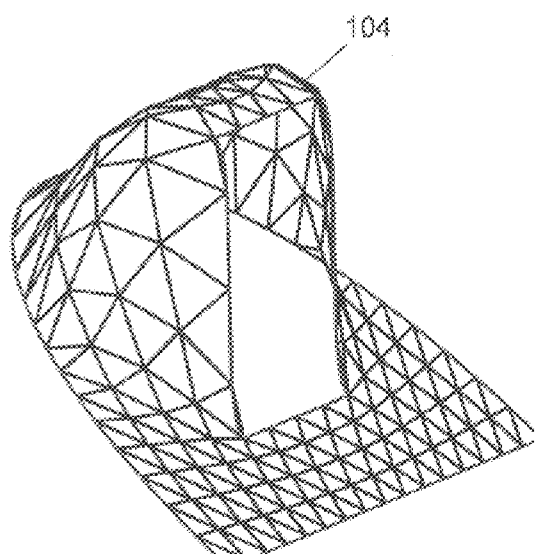

FIGS. 1A–1D illustrate an embodiment of a process of subdividing a three-dimensional mesh representation of an object surface composed of triangles. Before the subdivision process starts, as illustrated in FIG. 1A, mesh 100 is composed of large triangles and is very "blocky" in appearance. The curved lines identified with numeral 101 indicate the exact boundary curves that will be present in the final surface. In each subdivision step, each triangle may be divided into four child triangles. After one level of subdivision, as illustrated in FIG. 1B, resulting mesh 102 is still "blocky," but the boundary curves 101 are being followed more precisely. Mesh 104 in FIG. 1C shows the surface after one more level of subdivision. As can be seen, the surface begins to appear smoother. After several more subdivisions, smooth surface 106 in FIG. 1D results. Note that the boundary of the surface 106 is exactly the same as the boundary lines 101 in the initial mesh 100 of FIG. 1A.

Figure 1D:
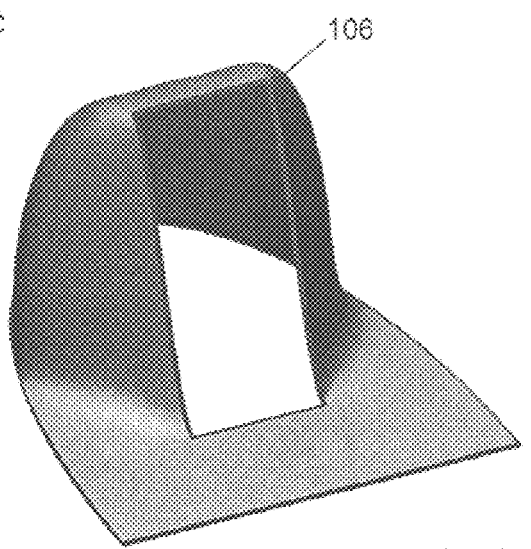

Surface 106 in FIG. 1D is what is known as the "limit surface." Generally speaking, the limit surface is what results when a subdivision surface representation is subdivided infinitely. For a particular subdivision representation, it can be shown that the corresponding limit surface is continuous and possesses other desirable properties. As will be seen, it is useful to be able to perform various operations in relation to the limit surface, including determining the limit surface from a subdivision representation, and determining the location on the limit surface of the limit point corresponding to a vertex within a mesh.

Figure 2:
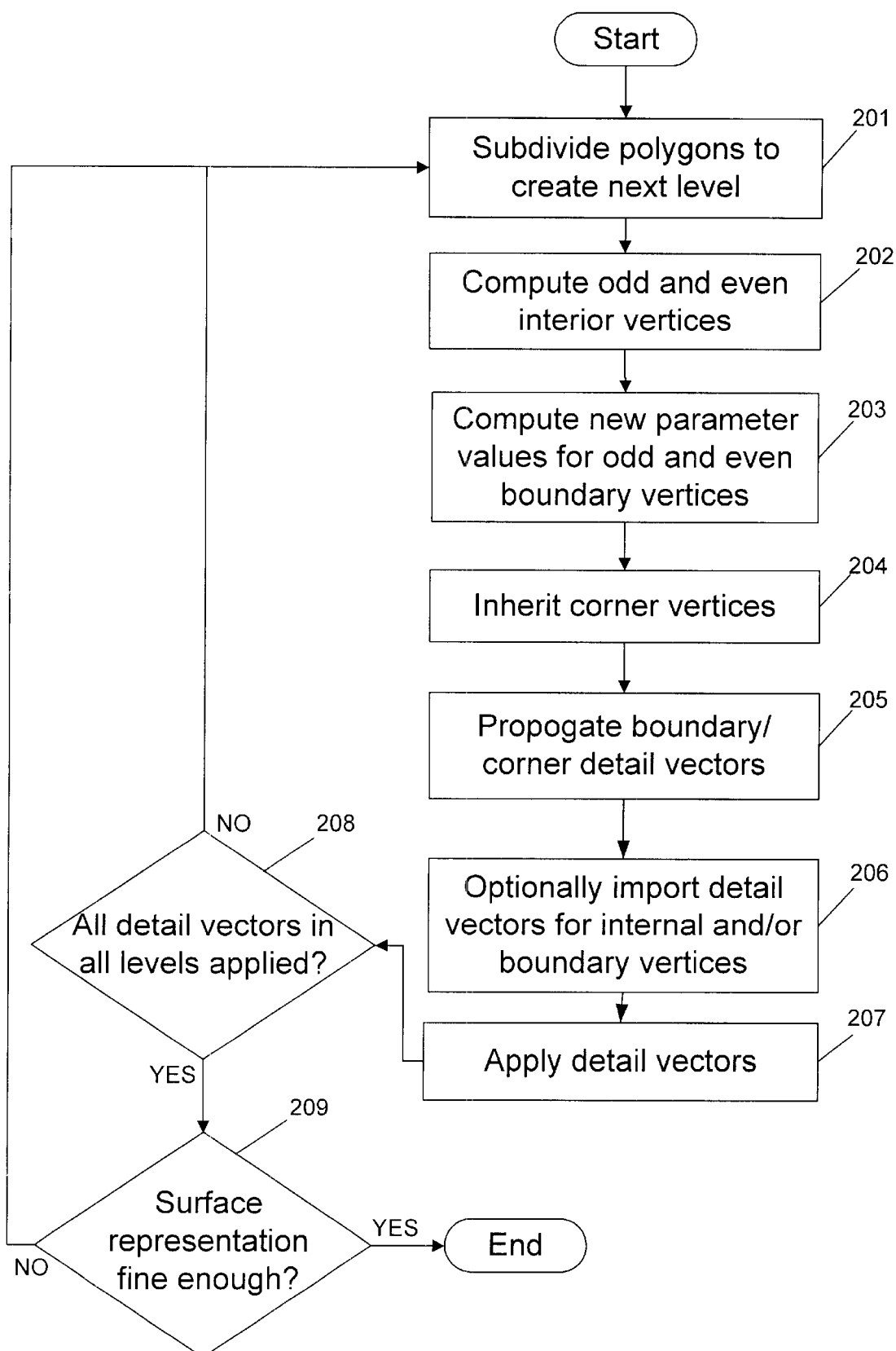
FIG. 2 is a flowchart of one embodiment of a method for producing a surface representation of an object.

An embodiment of a method for subdividing a representation of an object surface comprising a mesh of tessellated polygons is illustrated in FIG. 2. It is assumed that an initial high level polygonal mesh representation of the surface has been provided, e.g., from a CAD system, with some or all of the vertices of the initial mesh or any mesh produced by subdivision having corresponding "detail vectors" to more accurately depict the object surface. A "boundary" vertex is a polygonal vertex in the initial mesh which lies on one of the boundaries of the object surface. A "corner" vertex is a species of a "boundary" vertex. It represents a corner at the boundary of an object where two boundary curves meet. These are to be contrasted with an "interior" vertex, which is a polygonal vertex located on an interior portion of the surface, that is, a portion of the surface within and bounded by the surface boundaries.

A detail vector for a boundary vertex is related to the second derivative of the limit surface at that boundary vertex. In one implementation, the following equation describes this relationship:

$$d_i^j = 1/6 \left( \frac{\partial^2}{\partial u^2} + \frac{\partial^2}{\partial u \partial v} + \frac{\partial^2}{\partial v^2} \right) S(u, v) \Big|_{Lp_i^j} \quad (1)$$

where S(u,v) denotes the surface of the object parameterized by (u,v), with u along the boundary curve and v transverse to the curve; $d_i^j$ represents the detail vector for the ith vertex at the jth level of the hierarchy; and $Lp_i^j$ represents the location on the limit surface of the limit point corresponding to the ith vertex at the jth level of the hierarchy. Detail vectors are often included to more accurately depict the object surface.

Figure 12A:
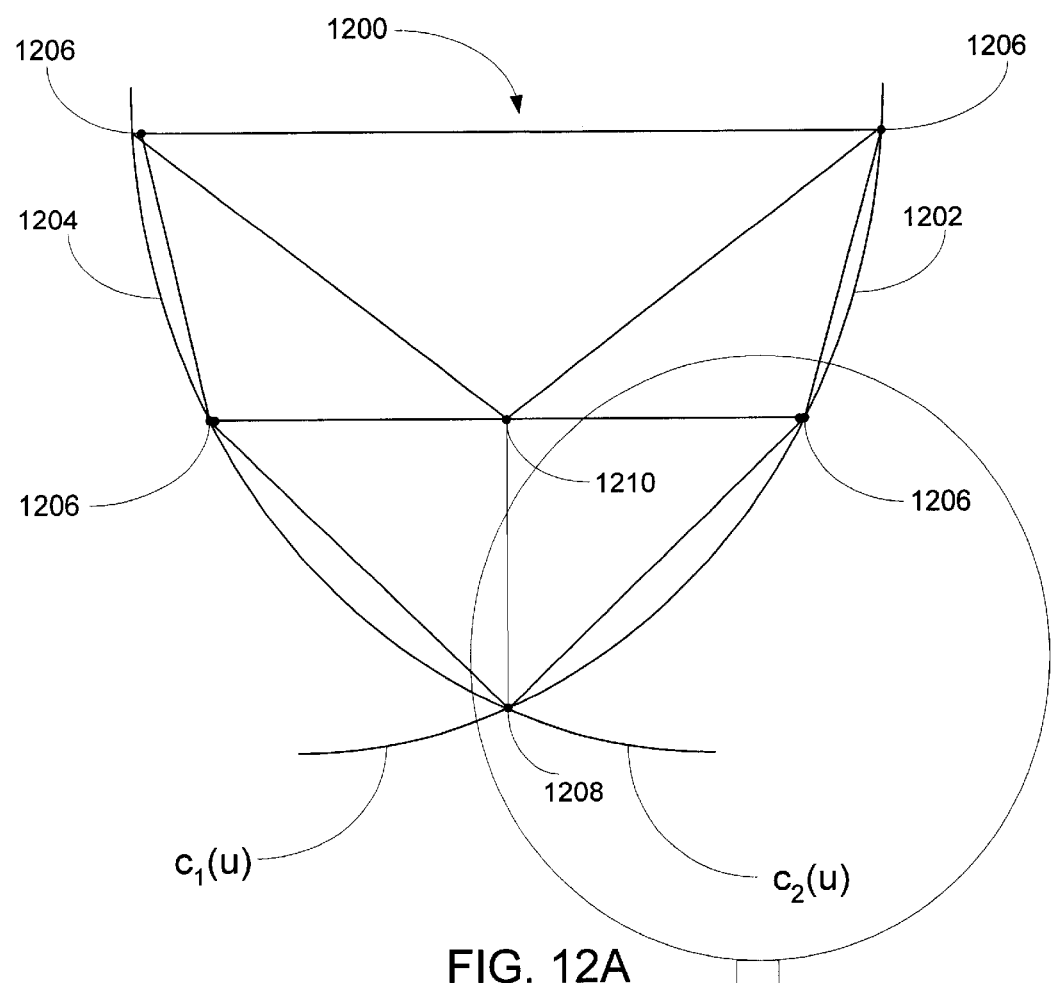
FIG. 12 illustrates one embodiment of a detail vector.

These concepts are illustrated in FIG. 12A, in which numeral 1200 identifies a portion of a polygonal mesh representation of an object, and numerals 1202 and 1204 represent two intersecting boundary curves, $c_1$ and $c_2$ respectively, each representing the boundary of the underlying object. Non-corner boundary vertices within the mesh representation are identified with numerals 1206. A corner vertex is identified with numeral 1208. An interior vertex is identified with numeral 1210. As can be seen, boundary vertices (and corner vertices, which are a species of boundary vertices) will always be located on one of the boundary curves in the absence of boundary detail vectors. However, the limit point of a boundary vertex is always guaranteed to lie on the boundary curve.

Figure 12B:
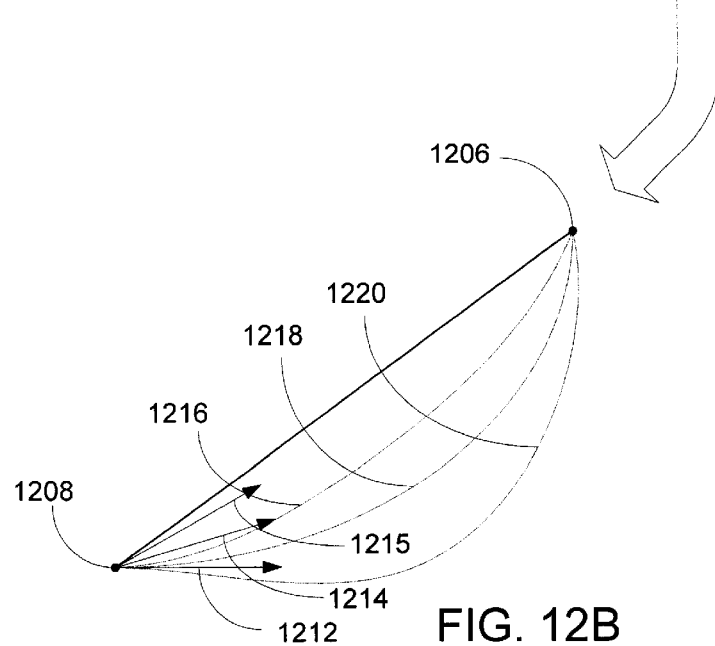

FIG. 12B is a blow up of the circled area in FIG. 12A and is included to further explain boundary detail vectors. As explained previously, the detail vector for a boundary vertex 1206 is related to the second derivative of the limit surface at the limit point corresponding to that vertex. Thus, with reference to FIG. 12B, if the limit surface were as identified by numeral 1216, the detail vector for vertex 1208 might appear as identified by numeral 1212. A detail vector for the limit surface as identified by numeral 1218 might appear as the vector identified by numeral 1214. For the limit surface 1220, the detail vector might appear as identified by numeral 1215.

Figure 13A:
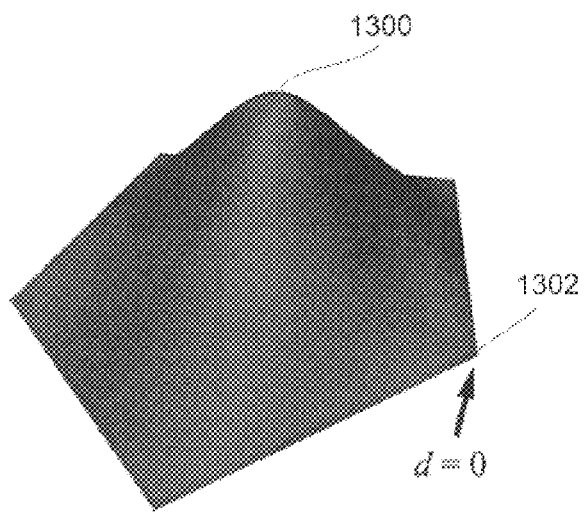
FIGS. 13A–13C illustrate the effect of a boundary detail vector.
Figure 13B:
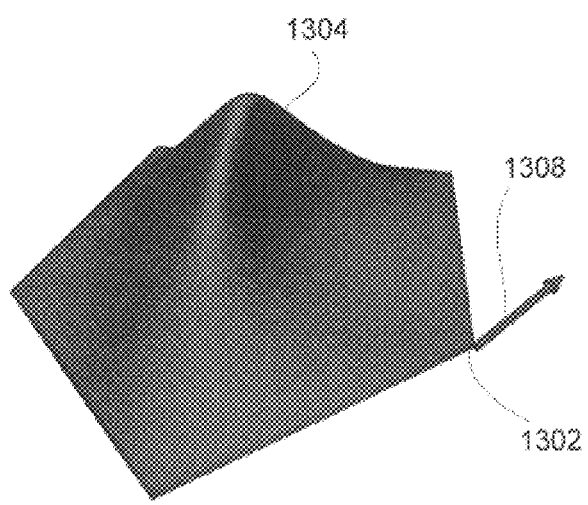
Figure 13C:
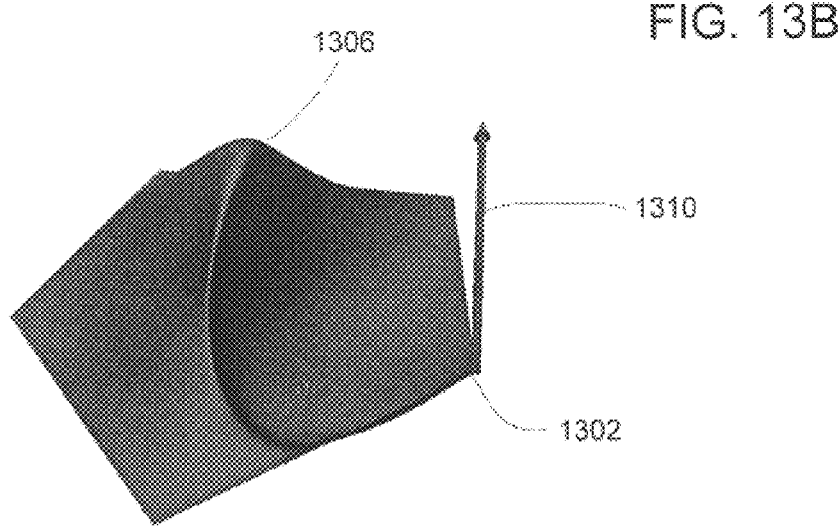

FIGS. 13A–13C illustrate the effect of boundary detail vectors. In FIG. 13A, surface 1300 has a detail vector of zero at point 1302. In FIG. 13B, surface 1304 is identical to surface 1300 with the exception that point 1302 now has associated with it detail vector 1308. Note the resulting curvature of surface 1304 near the boundary. In FIG. 13C, point 1302 has associated with it detail vector 1310, of larger magnitude than detail vector 1308, with a resulting stronger curvature of surface 1306.

FIGS. 14A–14C illustrate one use of interior detail vectors. FIG. 14A illustrates a control mesh 1400 and FIG. 14B illustrates control mesh 1400's limit surface. FIG. 14C illustrates the result of adding detail vectors over five levels of subdivision to ensure that the resulting surface 1404 matches the octant of a sphere.

The process of FIG. 2 is an iterative one in which, at each iteration, a mesh of coarser resolution is subdivided to produce a mesh of finer resolution. Vertices in the coarser mesh are present in the finer mesh, but, in addition, new vertices are introduced to the finer mesh which are not present in the coarser mesh.

In a particular iteration of the method of FIG. 2, all or only a portion of a mesh may be subdivided. When only a portion of a mesh is subdivided, the process is referred to as "adaptive subdivision". When all of a mesh is subdivided, the process is referred to as "uniform subdivision".

An iteration of the process in FIG. 2 begins with step 201, in which the polygons in the coarser mesh are subdivided to produce the polygons in the finer mesh. In one embodiment, the polygons are triangles, and this step proceeds by subdividing each triangle at the current level into four triangles at the next level. The result is that the triangles at the next level form a finer resolution mesh than do the triangles at the previous level.

The vertices in the finer mesh that correspond to vertices in the coarser mesh are called "even" vertices. The vertices in the finer mesh that do not correspond to vertices in the coarser mesh, but which correspond to edges in the coarser mesh, are called "odd" vertices.

In step 202, the positions for the odd and even interior vertices in the finer mesh are computed. In one embodiment, the positions of the vertices in the finer mesh are computed differently for even and odd interior vertices. In one implementation, the positions of the vertices are computed by applying "subdivision stencils" to the positions of the vertices in the coarser mesh.

FIG. 6A illustrates one implementation of a stencil for determining the location of an interior even vertex in the finer mesh. Numeral 600 identifies the interior even vertex whose position in the finer mesh is sought to be determined. Numeral 601 identifies vertices within the coarser mesh that are adjacent to the vertex whose location is sought to be determined. It is assumed that there are k such adjacent vertices, indicating that the "valence" of vertex 600 is k.

As illustrated, the weight β in this implementation is computed in accordance with the following formula: $\beta = \alpha/(8k)$, where $\alpha = 5 - (3 + 2 \cos(2\pi/k))^2/8$, and k is the valence of the center vertex 600. The weight (1−kβ) is also computed. The locations of each of the adjacent vertices 601 in the coarser mesh are then weighted by β, the location of the center vertex 600 in the coarser mesh is weighted by (1−kβ), and the weighted locations are then added together to determine the location of the center vertex 600 in the finer mesh.

FIG. 6B illustrates one implementation of a stencil for determining the location of an interior odd vertex in the finer mesh (subject to one exception which will be discussed in the following paragraph). The interior odd vertex whose location within the finer mesh is sought to be determined is identified with numeral 602, and the adjacent vertices in the coarser mesh are identified with numerals 603(a) and 603(b). As illustrated, the adjacent vertices identified with numeral 603(a) are assigned the weight 1/8, while the adjacent vertices identified with numeral 603(b) are assigned the weight 3/8. The location of the vertex 602 in the finer mesh is determined by weighting the locations of the vertices 603(a) with the weight 1/8, weighting the locations of the vertices 603(b) with the weight 3/8, and then summing the weighted locations.

FIG. 6C illustrates one implementation of a stencil for determining the location of an interior odd vertex in the finer mesh that is adjacent to a corner vertex (the one exception referred to above in relation to FIG. 6B). In this figure, the vertex whose location in the finer mesh is sought to be determined is identified with numeral 604, the adjacent corner vertex in the coarser mesh is identified with numeral 605(a), and the other adjacent vertices in the coarser mesh are identified with numerals 605(b), 605(c), and 605(d).

To utilize this stencil, the parameter y is determined as follows: $\gamma=\frac{1}{2}-\frac{1}{4}\cos(\theta_k)$. For convex corners, the angle $\theta_k$ is given by $\theta_k=\alpha/(k-1)$, where k is the valence of the corner vertex, and $\alpha$ is the angle made by the one-sided tangent vectors at the corner $605(a)$. For concave corners, the angle $\theta_k$ is given by $\theta_k=(2\pi-\alpha)/(k-1)$.

The weight $\frac{3}{4}-\gamma$ is then assigned to the corner vertex $605(a)$; the weight 1/8 is assigned to the vertex $605(b)$; the weight $\gamma$ is assigned to the vertex $605(c)$; and the weight 1/8 is assigned to the vertex $605(d)$. The locations of these vertices are then weighted by the corresponding weights, and the weighted locations summed to determine the location of the vertex 604 in the finer mesh.

Let $\tilde{p}_i^{j+1}$ be the location of the vertex 604 thus computed. In one implementation, a further adjustment is then required to determine this location in the finer mesh. Letting $\tilde{p}^\perp$ be the projection of this location in the tangent space at corner 605, the modified location $p_i^{j+1}$ of the vertex 604 is given by the following expression:

$$p_i^{j+1}=(1-s)\tilde{p}_i^{j+1}+s((1-t)p_c^{j+1}+t\tilde{p}^\perp) \quad (2)$$

where $s=1/(4\gamma+\cos(\pi/(k-1)))$ and $t=\|\tilde{p}_i^{j+1}-p_c^{j+1}\|/\|\tilde{p}^\perp-p_c^{j+1}\|$. In equation (2), s is a flatness parameter which is necessary for $C^2$ continuity, and $p_c^{j+1}$ is the control point for corner 605 at level j+1. In one implementation, this modification near corners is necessary to correctly deal with convex as well as concave corners.

Once the locations of the interior vertices in the finer mesh have been determined, step 203 in FIG. 2 is then performed. In step 203, new parametric values for all boundary vertices (excluding corner vertices) are computed. A "parametric" value for a vertex refers to a value of the parameter u corresponding to the vertex on one of the boundary curves $c_i(u)$. This is in contrast to the location of the vertex as specified in some arbitrary coordinate space, such as xyz Cartesian coordinate space. The location of the vertex having a parameter $u_k$ is $c(u_k)$, where c(u) is the parameterized equation defining a boundary curve. In step 203, boundary curve parameters are utilized to ensure that the corresponding boundary vertex locations always remain on one of the boundary curves.

In one embodiment, the parameters of the boundary vertices in the finer mesh are determined using stencils. Moreover, the stencils in this embodiment may differ depending on whether the vertex is an even boundary vertex, or an odd boundary vertex.

One implementation of a stencil for use in determining the parametric value of an even boundary vertex in the finer mesh is illustrated in FIG. 7A. Numeral 700 identifies the vertex whose parameter in the finer mesh is sought to be determined; and numerals 702(*a*) and 702(*b*) identify two adjacent boundary vertices in the finer mesh. As indicated by the stencil, the parametric value of vertex 702(*a*) is weighted by 1/8; the parametric value of vertex 702(*b*) is weighted by 1/8; and the parametric value of vertex 700 is weighted by weight 6/8. The weighted parameters are then added to form the parametric value of the vertex 700 in the finer mesh. Note that the location of the boundary vertex 700 in the finer mesh may then be determined from the equation c(u) for the appropriate boundary curve.

One implementation of a stencil for use in determining the parametric value of an odd boundary vector in the finer mesh is illustrated in FIG. 7B. Numeral 704 identifies the vertex whose parametric value in the finer mesh is sought to be determined; numerals 706(*a*) and 706(*b*) identify two adjacent boundary vectors in the coarser mesh. As indicated by the stencil, the parametric value of vertex 706(*a*) is weighted by ½, and the parametric value of vertex 706(*b*) is also weighted by ½. The weighted values are then summed to form the parametric value of the vertex 704 in the finer mesh. Again, the location of the vertex 704 in the finer mesh may then be determined from this parametric value.

Once the parameters of the boundary vertices in the finer mesh have been determined, step 204 in FIG. 2 is performed. In step 204, the parameters of the corner vertices in the finer mesh are determined. Again, in one embodiment, a stencil is used to perform this function. One implementation of such a stencil for use in determining the parameter of a corner vertex in the finer mesh is illustrated in FIG. 7C. Numeral 708 in this figure identifies the corner vertex whose parameter in the finer mesh is sought to be determined. As illustrated, the weight of 1 simply means that the parameter, and hence location, of the corner vertex in the coarser mesh in this implementation is simply carried forward without change into the finer mesh.

Once the parameters of the corner vertices in the finer mesh have been determined, optional step 205 in FIG. 2 may be performed. In optional step 205, any detail vectors that correspond to boundary vertices in the coarser mesh are propagated to the boundary vertices in the finer mesh. In one embodiment, the detail vectors are propagated to the finer mesh through the use of stencils. Moreover, in this embodiment, the stencils may differ depending on whether the boundary vertex is an even boundary vertex, an odd boundary vertex, or a corner vertex.

FIG. 7D illustrates one implementation of a stencil for propagating a detail vector corresponding to an even boundary vertex. Numeral 710 identifies the vertex in question. The weight ¼ indicates that the detail vector for the vertex 710 in the coarser mesh is simply carried over to the same vertex within the finer mesh after weighting it by a weight of ¼.

FIG. 7E illustrates one implementation of a stencil for propagating a detail vector corresponding to an odd boundary vertex. Numeral 712 identifies the vertex in question, and numerals 714(*a*) and 714(*b*) identify adjacent boundary vectors that appear in the coarser mesh. The stencil indicates that the detail vector for the vertex 712 in the finer mesh is computed by weighting the detail vector for vertex 714(*a*) in the coarser mesh by 1/8, weighting the detail vector for the vertex 714(*b*) in the coarser mesh by 1/8, and then summing the two weighted detail vectors.

FIG. 7F illustrates one implementation of a stencil for propagating a detail vector corresponding to a corner vertex. Numeral 716 identifies the corner vertex in question. The weight ¼ indicates that the detail vector for the vertex 716 in the coarser mesh is propagated to the same vertex in the finer mesh after multiplying it by the weight ¼.

These weights are obtained by using a boundary detail vector decay factor of 1/4. This explains the weights in FIGS. 7D and 7F. In FIG. 7E, for odd boundary vertices, the detail vector is computed as the average of the adjacent values, so weights of 1/8 are necessary.

Once the detail vectors for the boundary vertices have been propagated, step 206 in FIG. 2 is performed. In step 206, detail vectors for the interior vertices are optionally imported from an arbitrary source. The detail vector for an interior vertex is related to the displacement of the limit point and the surrounding surface.

After optional step 206, step 207 is performed. In step 207, the detail vectors corresponding to the vertices in the finer mesh are "applied" to obtain the final positions for the vertices. For interior vertices, these detail vectors were imported in step 206. For boundary vertices, these detail vectors were propagated in step 205.

In one implementation, the final position of an even boundary vertex in the finer mesh may be represented by the formula:

$$p_i^{j+1} = c(\tfrac{1}{8}(u_{i-1}^j + 6u_i^j + u_{i+1}^j)) - d_i^{j+1} \quad (3)$$

where $u_i^j$ is the parameter for the vertex within the coarser mesh, $u_{i-1}^j$ and $u_{i+1}^j$ are parameters for adjacent boundary vertices within the coarser mesh, c is the boundary curve on which the vertices are situated, $d_i^{j+1}$ is the detail vector for the boundary vertex in question, and $p_i^{j+1}$ is the final position of the vertex in question. Note that the weights 1/8, 6/8, and 1/8 applied to the parameters $u_{i-1}^j$, $u_i^j$, and $u_{i+1}^j$ simply reflect the weights in the stencil illustrated in FIG. 7A.

In one implementation, the final position of an odd boundary vertex may be represented by the formula:

$$p_i^{j+1} = c(\tfrac{1}{2}(u_{i-1}^j + u_{i+1}^j)) - d_i^{j+1} \quad (4)$$

Note that the weights in this relationship simply reflect the weights illustrated in the stencil of FIG. 7B.

In one implementation, the final position of a corner vertex may be represented by the formula:

$$p_i^{j+1} = c_1(u_{1i}^j) - d_i^{j+1} = c_2(u_{2i}^j) - d_i^{j+1} \quad (5)$$

This formula reflects the fact that the location of a corner vertex will appear within two intersecting boundary curves, $c_1$ and $c_2$, with two different parameters, $u_{1i}^j$ and $u_{2i}^j$, for defining the same location on each of the respective curves. Note that this relationship reflects the stencil illustrated in FIG. 7C.

After the detail vectors have been applied, step 208 in FIG. 2 is then performed. In step 208, it is determined if all prescribed detail vectors have been applied at all levels; if not, the process loops back to step 201 to perform another iteration. If so, the method proceeds to step 209.

Next, step 209 is performed. In step 209, it is determined if the resolution of the resulting control mesh is fine enough for the intended application. If not, the process loops back to step 201 to perform another iteration. If so, the method ends.

Adaptive subdivision is identical to uniform subdivision in computation, except that only a subset of the triangles in the coarser mesh are subdivided. For repeated iterations of adaptive subdivision, a restriction criterion is applied in which a triangle can only be subdivided if all of the triangles adjacent to it in the coarser mesh are present. This is necessary to ensure that the vertices of the triangles have their neighborhoods fully defined so that the subdivision stencils can be applied. If the restriction criterion is not satisfied, it may be necessary to first generate the neighboring triangles by subdividing a higher level mesh.

The locations of limit points of vertices on the limit surface can be determined through a variant of the process illustrated in FIG. 2. As will be seen, these locations are useful to determine during the operation of a trimming procedure defined farther on in this disclosure.

In one implementation, the limit point of an interior vertex can be computed using the stencil of FIG. 6A, but with the parameter $\beta$ determined as follows: $\beta = \alpha/(k(3+\alpha))$, with $\alpha = 5 - (3 + 2\cos(2\pi/k))^2/8$, and k being the valence of the center vertex.

In one implementation, the limit point of a boundary vertex, $Lp_i^j$, is given by the formula:

$$Lp_i^{j+1} = c(\tfrac{1}{6}(u_{i-1}^j + 4u_i^j + u_{i+1}^j)) \quad (6)$$

Note that these weights are different from the weights in equation (3). Here the limit point is being computed. In contrast, in equation (3), the next position of the vertex in a finer mesh is being computed.

The limit point of a corner vertex in this implementation is given by $c_1(u_{1i}^j) = c_2(u_{2i}^j)$.

There is one subtlety in computing the limit of an interior point. In one implementation, it should be performed using the finest mesh possible that has non-zero detail vectors. Such a mesh may be determined by repeatedly invoking the procedure of FIG. 2 until a mesh has been determined where the boundary details propagated from one level to another are zero. The previous level in the hierarchy then defines the finest mesh possible with non-zero detail vectors.

A surface representation as produced by any of the methods discussed in this section may be embodied in the form of data or data structures. The surface representation may comprise a mesh of polygons, a subdivided mesh of polygons, a repeatedly subdivided mesh of polygons, a hierarchical mesh of subdivided or repeatedly subdivided polygons, a tessellated mesh of polygons, or any combination or sub-combination of the foregoing. The surface representation may also have a corresponding limit surface. These data or data structures, as the case may be, may exist independently, or they may be stored in a memory or a computer readable medium including, without limitation, a hard disk, a floppy disk, RAM, ROM, EPROM, EEPROM, PROM, flash memory, volatile memory, read/write memory, non-volatile memory, CD-ROM, DVD, etc.

Similarly, any of the methods discussed in this section may be embodied in the form of a series of computer readable and executable instructions. These instructions may exist independently, or they may be stored on a computer readable medium or memory.

In one embodiment, a key defining attribute of a surface representation as described in this section is the constraint that the locations of the boundary vertices, whatever the level, always be maintained on one or more of the boundary curves that bound the surface being represented.

In another embodiment, a key defining attribute of a surface representation as described in this section is the presence of detail vectors at one or more levels of the hierarchy.

It should be appreciated from a reading of this disclosure that the invention may be applied to a variety of subdivision representations, including Loop's subdivision scheme, i.e. the generalization of quartic box-splines to arbitrary topology, and the Catmull-Clark subdivision scheme, which generalizes tensor product cubic B-splines to arbitrary topology.

II. Detail Vectors

As described in the previous section, a representation of an object surface may be defined in term of vertices and detail vectors. In this section, a method of determining detail vectors is discussed.

Figure 3A:
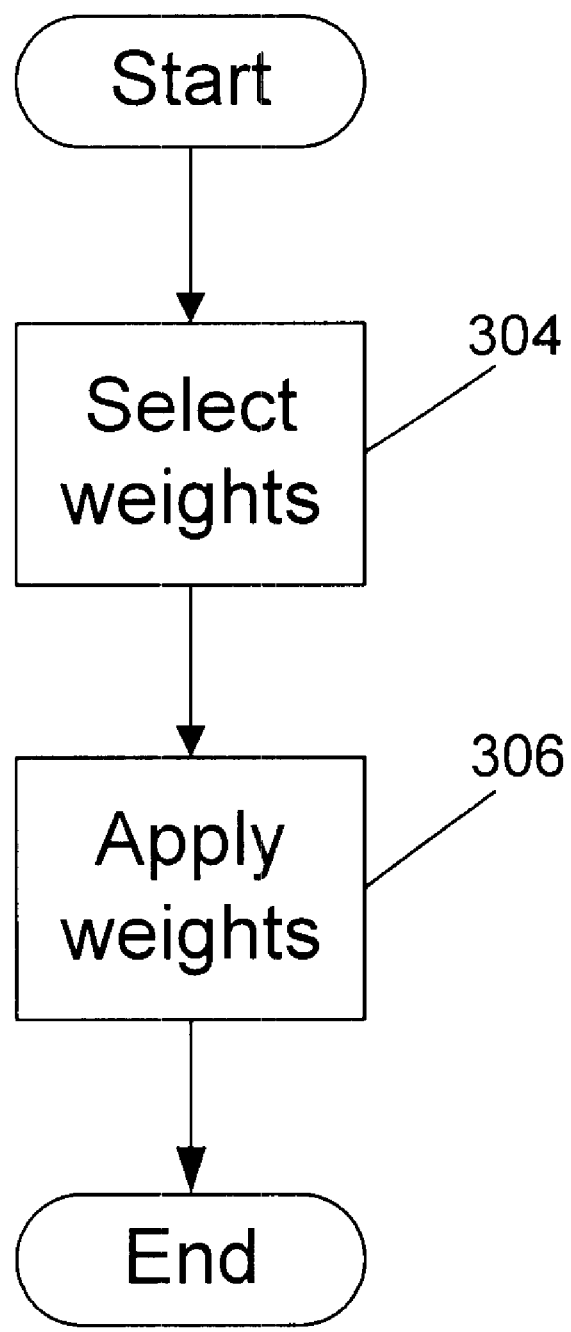
FIG. 3 is a flowchart of one embodiment of a method for producing a detail vector.

One embodiment of a method for determining detail vectors is illustrated in FIG. 3A. The method, which determines a detail vector for a given vertex p, begins in step 304. There, the method selects one or more prescribed weights for use in determining the detail vector for the vertex p. In one implementation, the method selects quasi-interpolating or interpolating weights based on various factors such as the vertex type (boundary, corner, interior), the valence of the vertex, and the level of the hierarchy of the subdivision representation where the vertex appears. An interpolating stencil is one that provides an approximation that exactly matches the data being approximated. A quasi-interpolating stencil is one that is interpolating up to a certain polynomial degree, in this case, cubic.

Step 306 is then performed. In step 306, the method applies the weights to determine the detail vector for the vertex p. In one embodiment, this step may include determining difference vectors for the vertex p and difference vectors for vertices in the neighborhood of p. A difference vector for a vertex is the difference between the vertex as mapped onto the original object surface, and the limit of the vertex. The weights are then applied to these difference vectors to determine the detail vector of the vertex p.

In some cases, such as when an interpolating stencil is involved, step 306 may involve determining the difference vector for the vertex p, and then applying a suitable weight to this difference vector to determine the detail vector for the vertex p. Difference vectors for neighboring vertices may not be considered in this computation, which would be indicated by a zero weight in the appropriate stencil.

Also, for some vertices, the method may avoid determining difference vectors altogether. For example, in one implementation, the detail vector for a corner vertex may be determined by applying suitable weights to the detail vectors for one or more adjacent vertices.

Figure 3B:
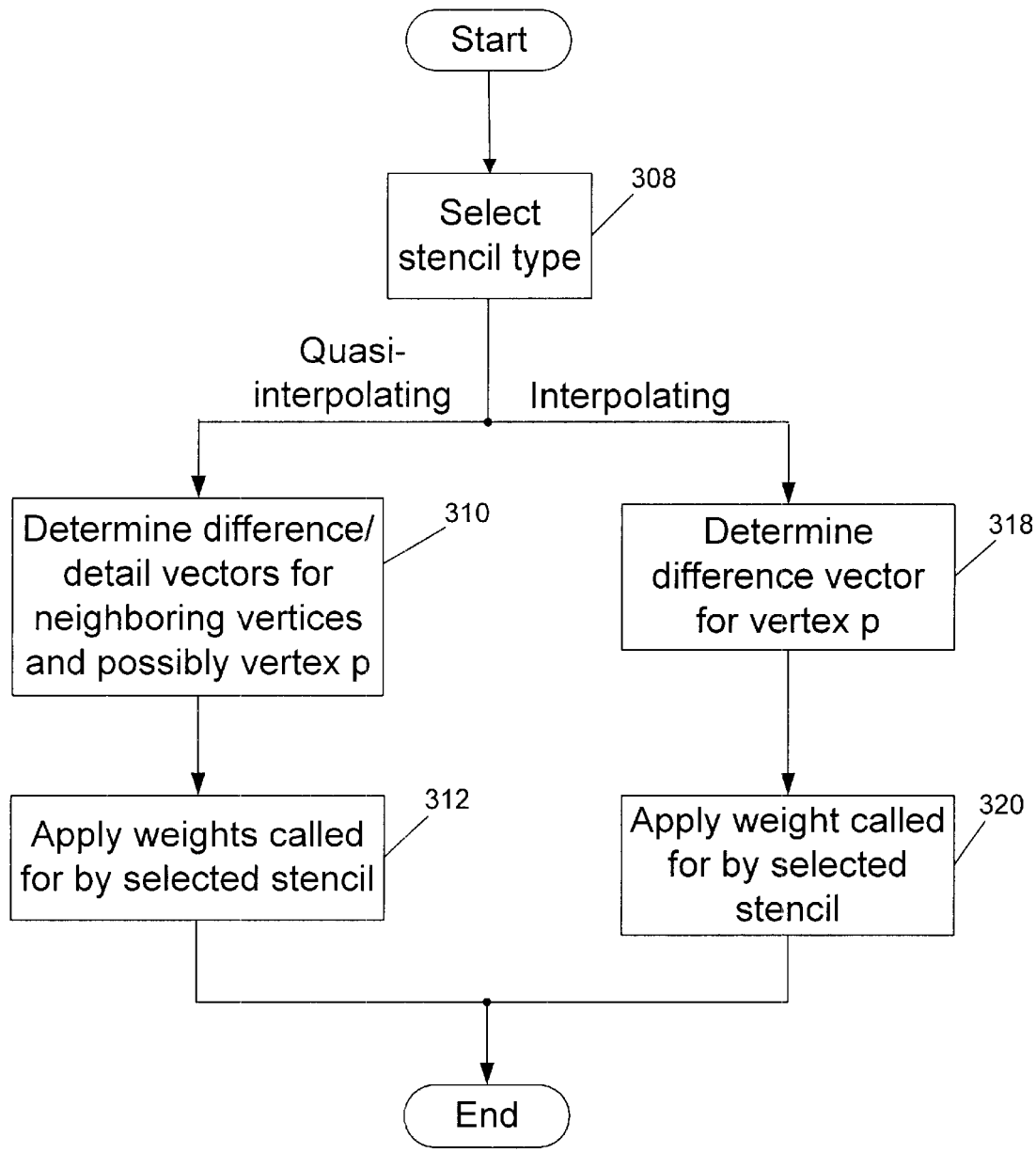

An implementation of the method of FIG. 3A is illustrated in FIG. 3B. In this implementation, the weights which are selected and applied to determine the detail vectors are defined or embodied in the form of stencil.

That implementation begins with step 308 in which the type of stencil, whether interpolating or quasi-interpolating, is selected. In one implementation example, the method applies a quasi-interpolating stencil to (1) all boundary vertices; (2) all corner vertices; (3) all interior vertices at level j=0; and (4) all interior vertices of valence six at levels j>0. The method in this implementation applies an interpolating stencil to all interior vertices of valence other than six at levels j>0.

If a quasi-interpolating stencil is to be applied, the method selects an appropriate quasi-interpolating stencil to use in determining the detail vector for the vertex p based at least in part on vertex type. Step 310 is then performed, in which, depending on the vertex type, difference vectors for the vertex p as well as difference vectors for vertices in the neighborhood of vertex p may be computed. A difference vector is the difference between the vertex as mapped onto the original object surface, and the limit of the vertex. In some cases, again depending on vertex type, this step may involve simply determining the difference vector for the vertex p and avoiding determining the difference vectors of adjacent vectors. In other cases, this step may involve determining detail vectors for the neighboring vertices rather than the difference vectors.

Step 312 is then performed, in which the weights called for by the stencil are applied to the difference or detail vectors computed in the previous step. The weighted vectors are then summed to arrive at the detail vector for the vertex p. The process then terminates.

Figures 8A, 8B, 8C:
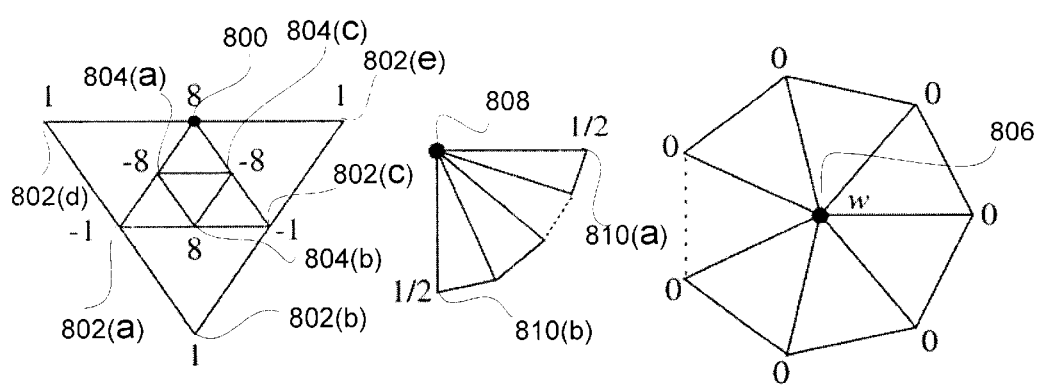
FIGS. 8A–8C illustrate one embodiment of the stencils used in determining the quasi-interpolation vector for a vertex.

In one implementation, for non-corner boundary vertices, the method applies the stencil illustrated in FIG. 8A. With reference to FIG. 8A, the vertex p in question is identified by numeral 800. Numerals 804(a), 804(b), 804(c), 802(a), 802(b), 802(c), 802(d), and 802(e) identify some of the vertices within the neighborhood of vertex p. As can be seen, each of these vertices has a corresponding weight associated with it. These weights are used to determine the detail vector for vertex p as follows: the difference vectors for vertices 802(a) and 802(c) are weighted with the value −1; the difference vectors for vertices 802(b), 802(d), and 802(e) are weighted with the value 1; the difference vectors for the vertices 804(a) and 804(c) are weighted with the value −8; and the difference vectors for the vertices 800 and 804(b) are weighted with the value 8. The weighted difference vectors are then added to determine the detail vector for vertex p (identified with numeral 800).

In another implementation, for non-corner boundary vertices, the method forms the detail data for vertex p only from the weighted difference data for vertices in the neighborhood of p, such as vertices 804(a), 804(b), 804(c), 802(a), 802(b), 802(c), 802(d) and 802(e).

Note that, in certain instances, the triangle formed by the vertices 804(a), 804(b), and 804(c) may not yet be computed at the time that the detail vector for vertex p is sought to be computed. In this event, these vertices can simply be ignored. The resulting detail vector will have only quadratic precision, but has been found to still work well in practice. On the other hand, if cubic precision is necessary, these vertices can be computed through subdivision. If other vertices in the stencil do not yet exist at the time the stencil is applied, as can sometimes happen at coarsest levels of a subdivision hierarchy, the method may assign the difference vector for that vertex a weight of zero.

In one implementation, for all interior vertices at level j=0, and interior vertices of valence six at level j>0, the method applies the stencil illustrated in FIG. 6A with $\beta=-1/(2k)$, where k is the valence of the vertex. (Note that this is the same stencil discussed in the previous section for computing interior vertices as part of the subdivision process, although with a different value of $\beta$). To apply this stencil, the difference vectors for the adjacent vertices to the vertex p are weighted using the weight $\beta$, the difference vector for the vertex p is weighted by the weight $(1-k\beta)$, and the weighted difference vectors are then added to determine the detail vector for the vertex p.

In one implementation, for corner vertices, the method applies the stencil illustrated in FIG. 8B. Note that this stencil is applied to the detail vectors of neighboring vertices rather than the difference vectors of neighboring vertices. According to this stencil, subject to one qualification, the detail vector for the vertex p, which is identified with numeral 808 in the figure, is given by multiplying the detail vector for adjacent vertex 810(a) by ½, multiplying the detail vector for adjacent vertex 810(b) by ½, and then adding the weighted detail vectors to obtain the detail vector for vertex 808. The one qualification occurs when one or both of the adjacent vertices 810(a) and 810(b) are corner vertices. In this event, the weight given to the detail vector for an adjacent corner vertex is 0.

Turning back to step 308 in FIG. 3B for the moment, if an interpolating stencil is selected, step 318 is performed. In step 318, the difference vector for the vertex p is computed. Step 318 is followed by step 320, in which a suitable weight as called for by the stencil is applied to the difference vector for the vertex p. The result is the detail vector for the vertex p. The process then terminates.

In one embodiment, as discussed, the method applies interpolating stencils only to interior vertices of valence other than six at levels j>0. In one implementation, the method applies to these interior vertices the stencil illustrated in FIG. 8C, with $w=(3+\alpha)/3$, $\alpha=5-(3+2\cos(2\pi/k))^2/8$, and where k is valence of the center vertex. According to this stencil, the detail vector for the vertex p, which is identified with numeral 806 in the figure, is given by multiplying the difference vector for this vertex by the weight w. The difference vectors for the adjacent vertices do not factor into this equation since they are all assigned a weight of 0 in the stencil of FIG. 8C.

In a different embodiment, the above described stencils are applied to difference vectors that measure the difference between the limit of the vertex on the object surface and a corresponding point on a second object surface. This is illustrated in FIGS. 14A–14C. FIG. 14A illustrates a control mesh 1400 and FIG. 14B illustrates control mesh 1400's limit surface. It is desired to have limit surface 1402 approximate the shape of an octant of a sphere. In that case, the difference vectors are calculated from the limit of the vertices of control mesh 1400 and corresponding points on a perfect octant of a sphere. FIG. 14C illustrates the result of adding such detail vectors over five levels of subdivision.

Detail vectors as produced by any of the methods in this section may exist in the form of data or data structures which exist independently or which augment a surface representation as produced by any of the methods in the previous section. This data or these data structures, as the case may be, may exist independently, or they may be stored in a memory or a computer readable medium including, without limitation, a hard disk, a floppy disk, RAM, ROM, EPROM, EEPROM, PROM, flash memory, volatile memory, read/write memory, non-volatile memory, CD-ROM, DVD, etc.

Similarly, any of the methods of this section may be embodied in the form of a series of computer readable and executable instructions. These instructions may exist independently, or they may stored on a computer readable medium or memory.

III. Trimming Algorithm

This section addresses a method of trimming a surface representation of an object at a trim curve. The term "trimming" refers to altering the surface representation to insert a feature, such as a rivet hole, which may not be present in the original object surface, but which may be necessary or desirable for purposes of the manufacturing process.

Figure 4:
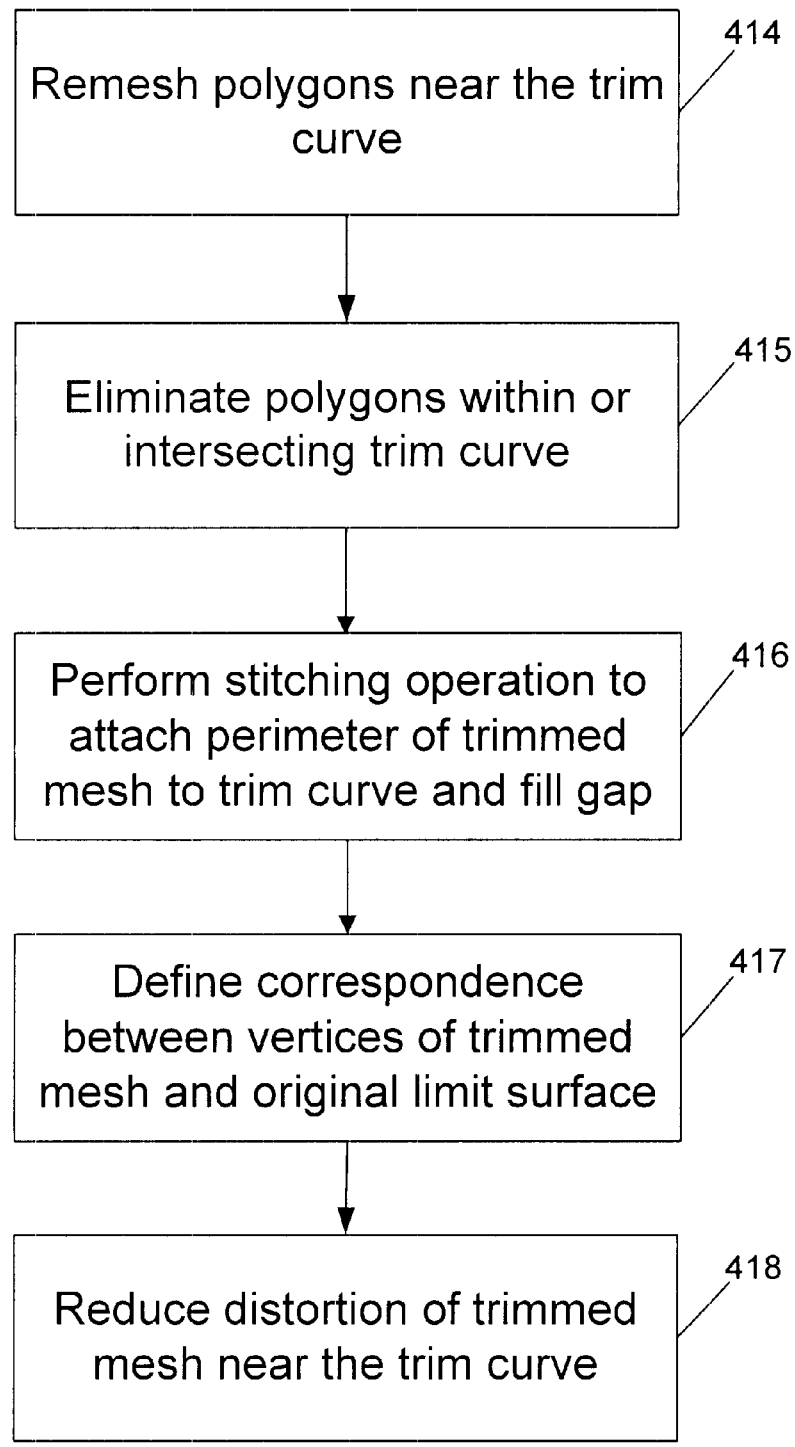
FIG. 4 is a flowchart of one embodiment of a trimming method.
Figure 5A:
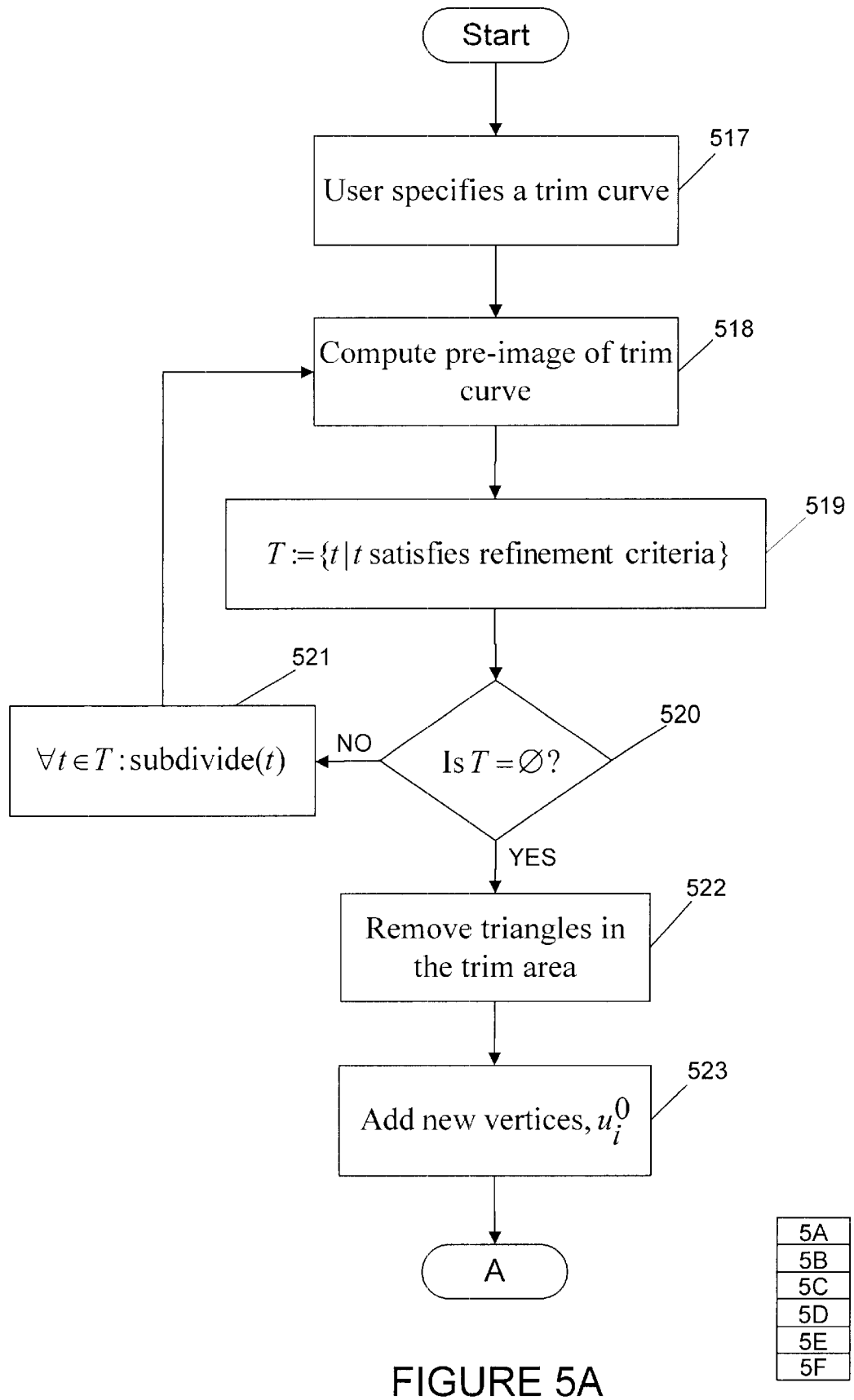
FIGS. 5A–5F are a flowchart of an implementation example of a trimming method.
Figure 5B:
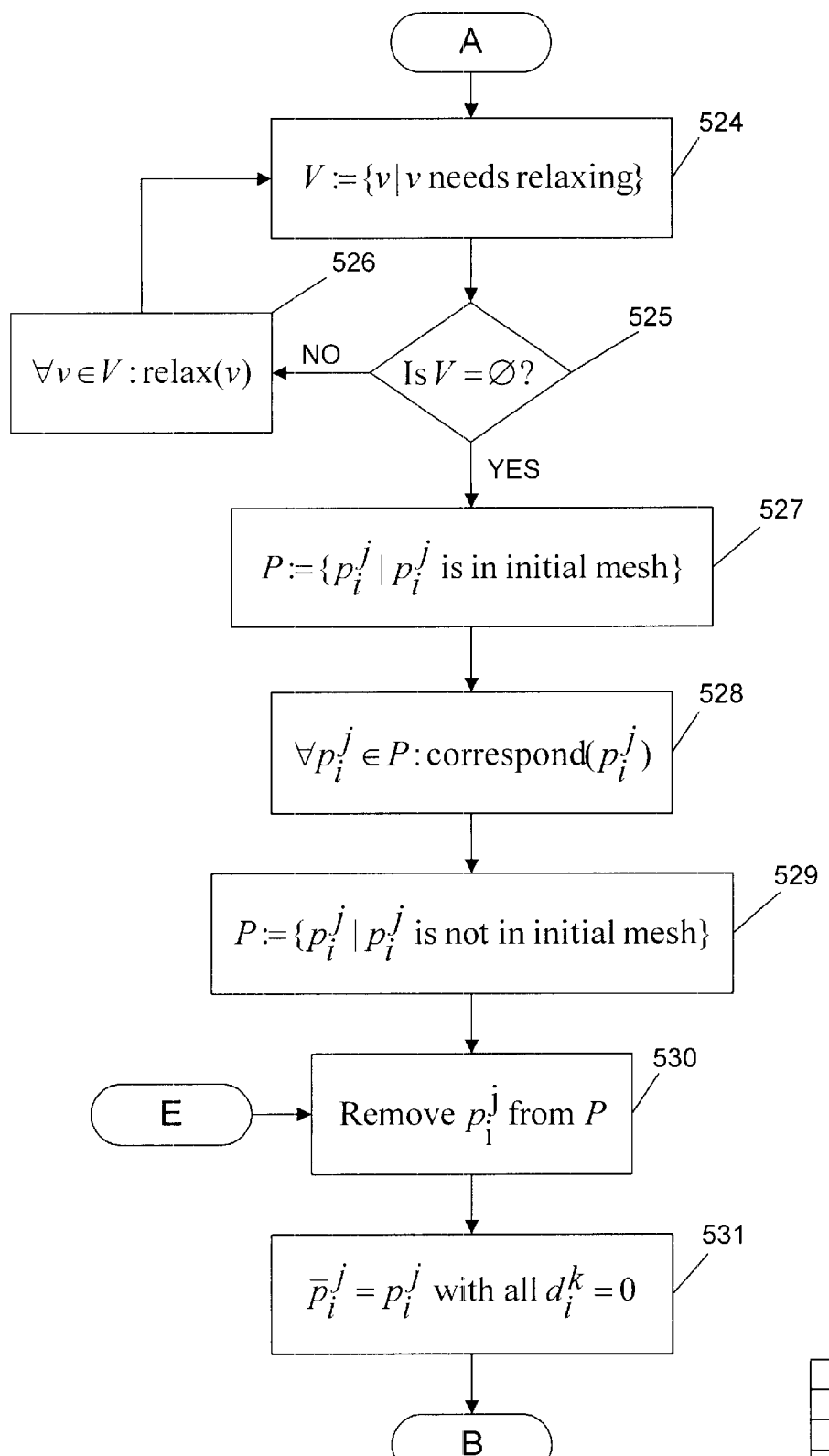
Figure 5C:
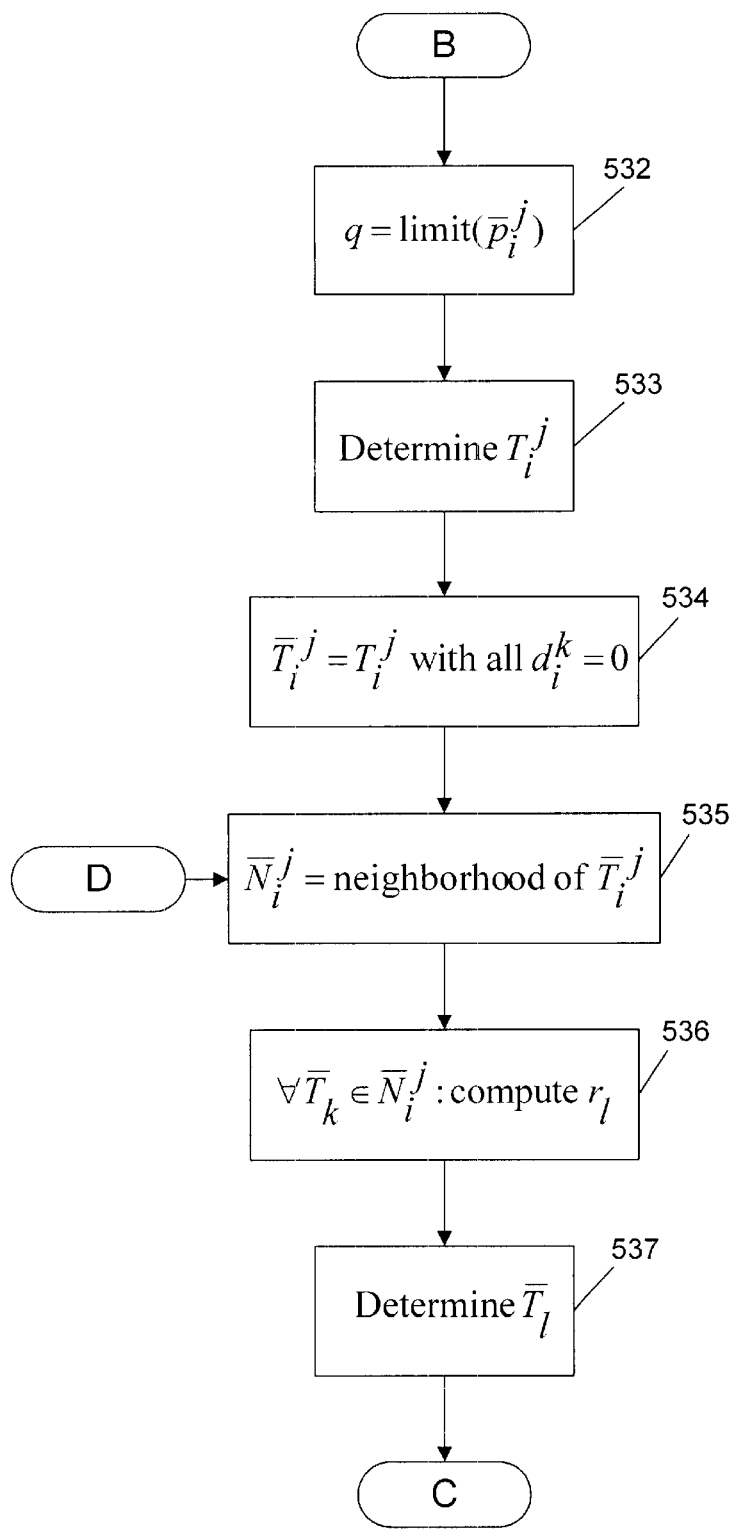
Figure 5D:
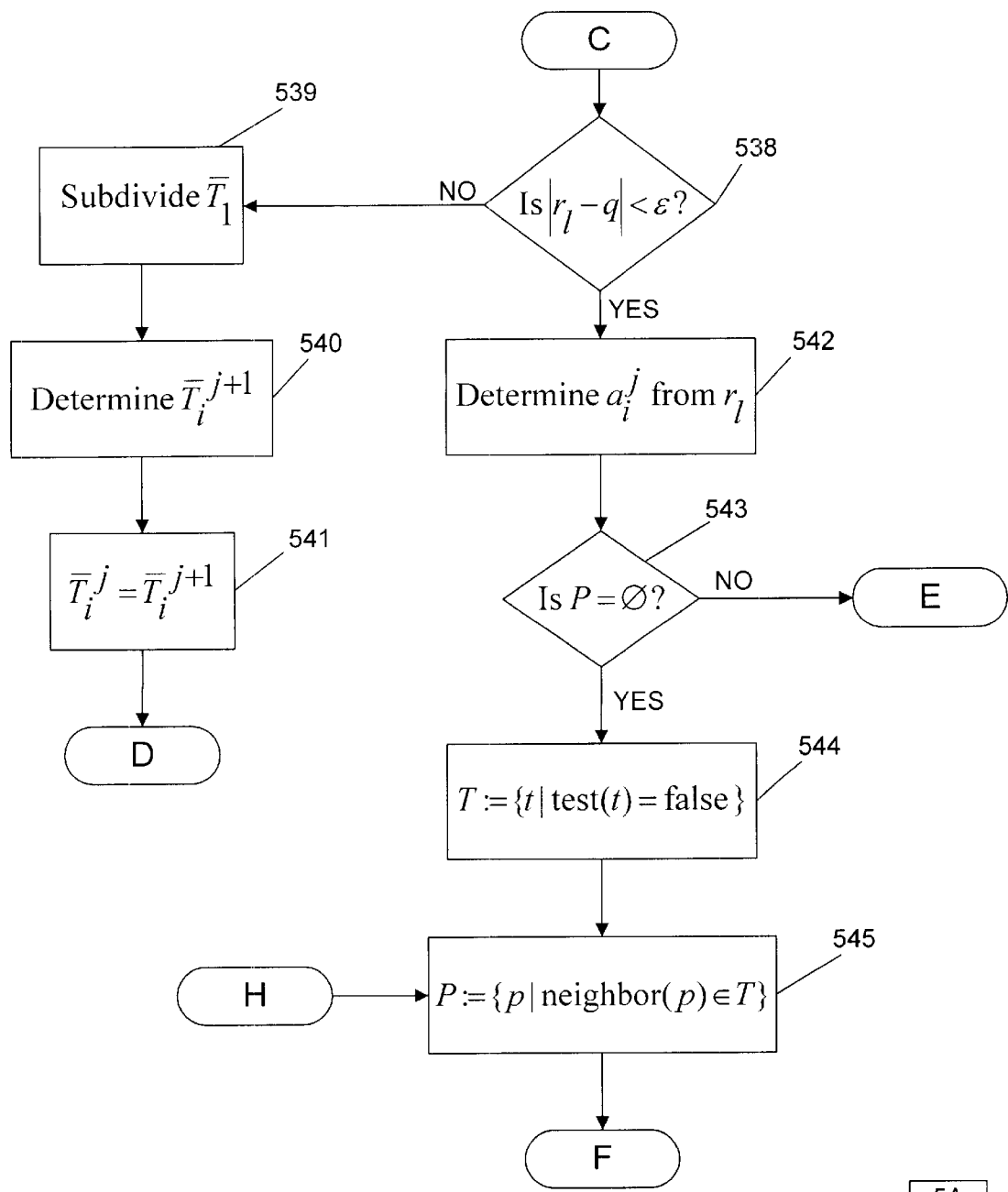
Figure 5E:
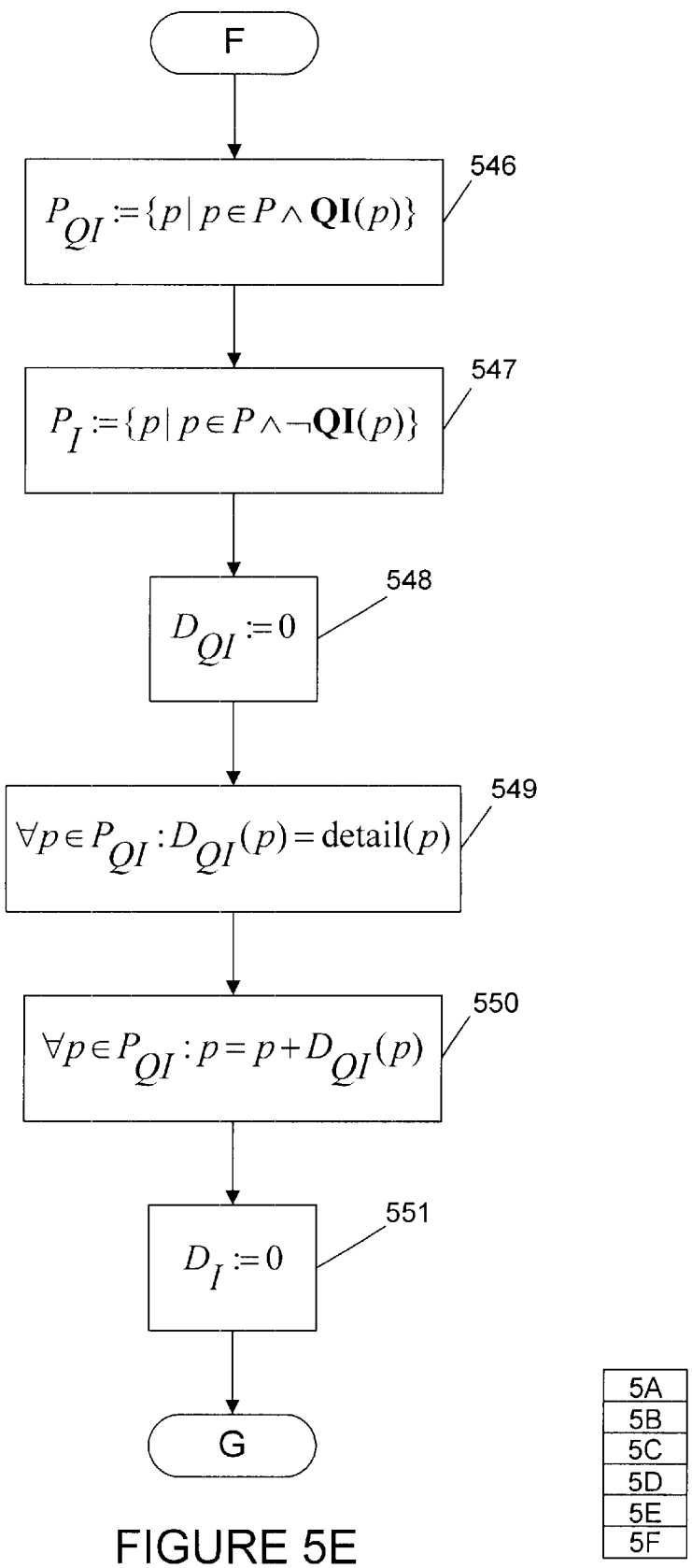
Figure 5F:
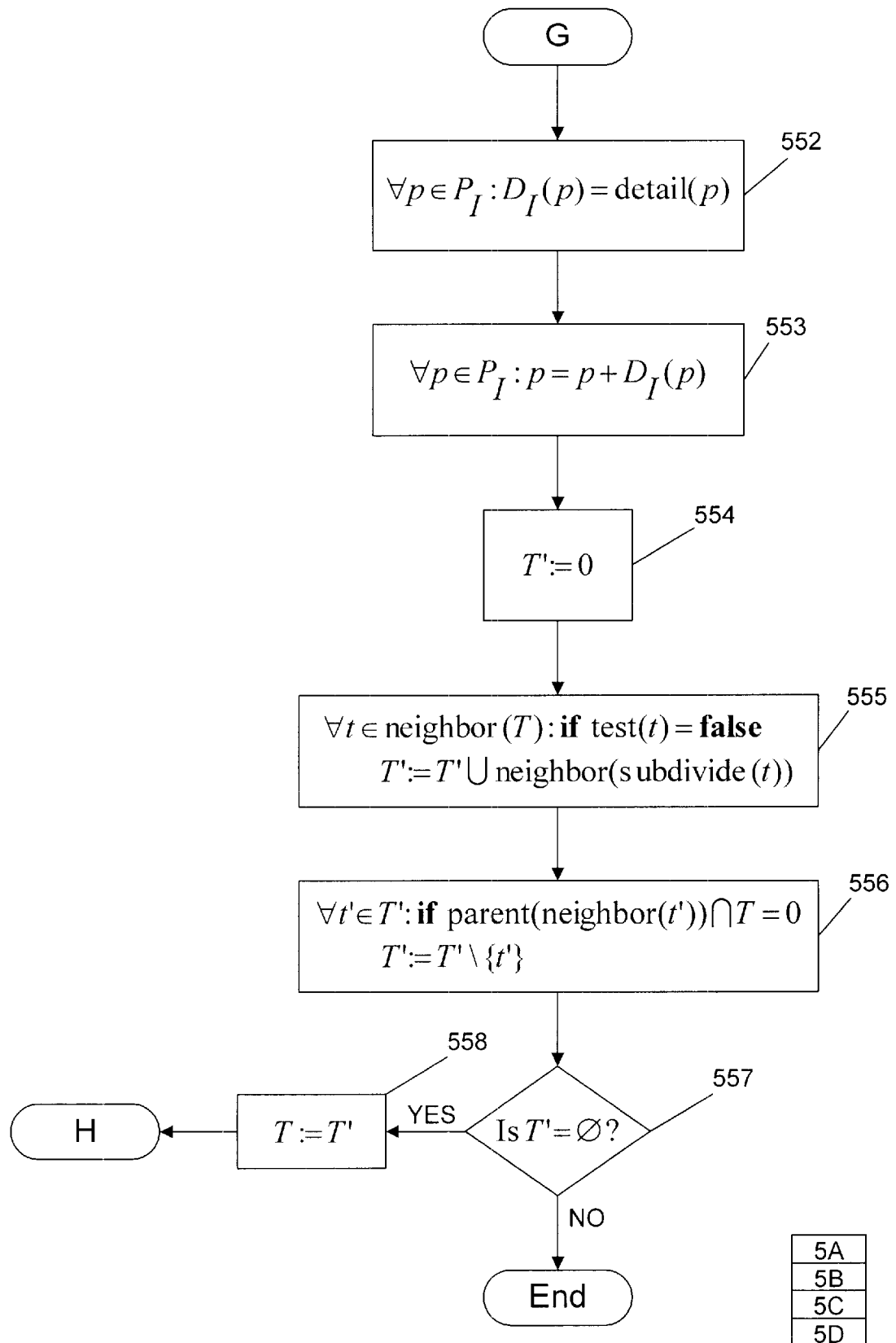

An embodiment of a trimming method in accordance with the subject invention is illustrated in FIG. 4. The method results in the construction of a new mesh representation in the vicinity of the trim curve. As will be seen, the construction of this new mesh results in a perturbation near the trim region, which is controlled or minimized through the introduction of detail vectors. These detail vectors may be computed through the methods described in the previous section.

The method begins with step 414, in which the polygonal mesh is remeshed in the locality of the trim curve. The purpose of this step is to introduce a sufficient level of detail into the mesh representation of the object so that the resolution of the remeshed surface representation corresponds to that of the trim curve.

Figure 9A:
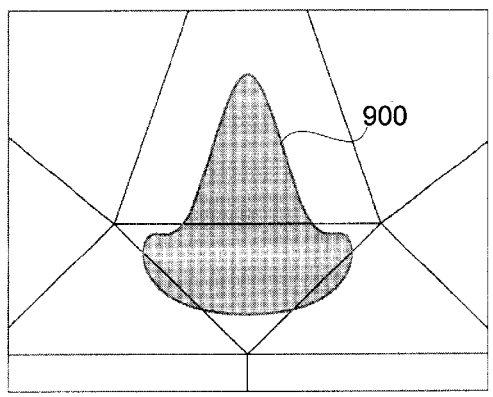
FIGS. 9A–9D illustrate the process of remeshing and trimming a surface.
Figure 9B:
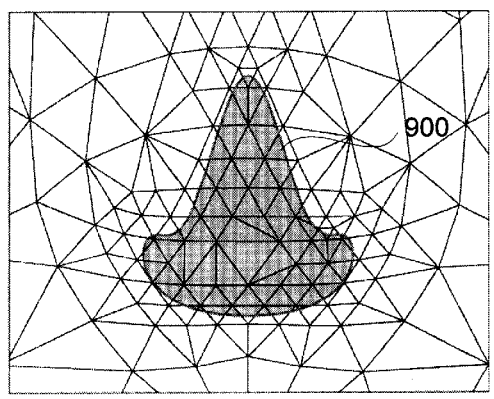

The function of this step is illustrated in FIGS. 9A–9B. FIG. 9A illustrates a trim curve 900 projected onto a non-symmetric high level mesh representation 902 of the object. As can be seen, there is a significant divergence between the resolution of the meshed representation in the vicinity of the trim curve and that required by the trim curve 900. FIG. 9B illustrates the portion of the remeshed surface in the vicinity of the trim curve. In one embodiment, this remeshing operation is performed using the adaptive subdivision method described in Section I above. As can be seen, the level of resolution represented by the remeshed surface more closely matches that of the trim curve.

Figure 9C:
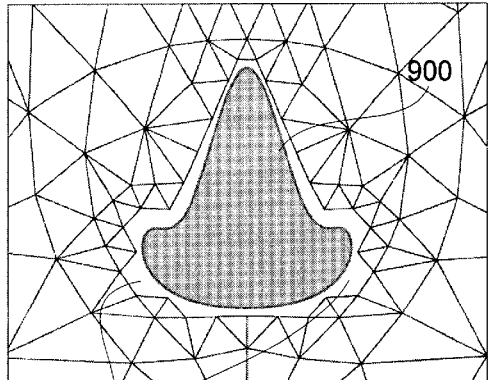

After step 414 in FIG. 4, step 415 is performed. In step 415, the polygons in the remeshed surface which are contained within, or which contact, the trim curve, are eliminated. The effect of performing this step is illustrated in FIG. 9C.

Figure 9D:
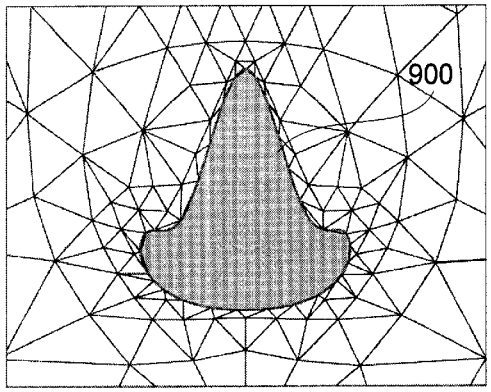

Step 416 is then performed. In step 416, a stitching operation is performed to attach the perimeter of the remeshed surface to the trim curve, and thereby fill the gap between this perimeter and the trim curve with polygons. This gap is identified in FIG. 9C with numeral 906. The effect of filling this gap through stitching is illustrated in FIG. 9D.

Step 417 in FIG. 4 is then performed. In step 417, a correspondence is determined between each of the vertices of the trimmed mesh, and a point on the limit surface defined by the original mesh. This step is necessary to permit detail vectors to be determined for the vertices using any of the methods discussed in the previous section. It will be recalled that those methods generally describe forming a detail vector from one or more difference vectors, which in turn are defined in terms of corresponding points on the limit surface.

For vertices far from the trim curve, which have not been affected by the trimming operation, the corresponding point is the limit point of the vertex. In one embodiment, for vertices in the vicinity of the trim curve, which have been introduced or perturbed through the trimming operation, a limit point may not exist on the original limit surface. For these vertices, a closest point relationship may be utilized whereby the point on the original limit surface which is closest to the projection of the vertex on the limit surface is taken to be the corresponding point.

Letting $p_i^j$ refer to one of these remaining vertices, in one embodiment, the process of determining the corresponding point on the original limit surface to this vertex proceeds by first determining the smoothed surface defined by the trimmed vertices assuming all detail vectors are set to zero. Let $\overline{p}_i^j$ refer to the vertex $p_i^j$ on this smoothed surface. The limit point $L\overline{p}_i^j$ is then determined by using the adaptive subdivision process described above in Section I with all detail vectors set to zero. The closest point $\overline{a}_i^j$ to $L\overline{p}_i^j$ on the limit surface of the original mesh assuming all detail vectors are set to zero is then determined using a closest point computation procedure in which the search region is restricted. Finally, the point $a_i^j$ on the original limit surface is determined using the parametric coordinates of $\overline{a}_i^j$. The point $a_i^j$ is then taken to be the corresponding point to $p_i^j$.

Step 418 is then performed. In step 418, any distortion in the trimmed mesh in the vicinity of the trim curve is reduced or eliminated. In one embodiment, this step proceeds by determining detail vectors for the vertices in the trimmed mesh through one of the methods described in the previous section. These detail vectors may then be applied to determine the final locations of the vertices. The effect is to reduce any distortion of the remeshed surface in the vicinity of the trim curve.

An implementation example of a trimming method in accordance with the subject invention is illustrated in FIGS. 5A–5F. In this implementation example, the polygons utilized are triangles, but it should be appreciated that other types of polygons besides triangles are possible.

The method begins in step 517, in which a trim curve is specified. The trim curve bounds a trim region that lies on the limit surface. In this implementation, the trim curve should be (a) piecewise smooth; (b) parameterized; and (c) capable of being evaluated for any parameter value $u\epsilon[0,1]$. Additionally, the relationship between the trim curve and the polygonal mesh should be known, in the form of an approximate projection or pre-image of the trim curve on the mesh.

This pre-image is calculated in the next step, step 518. Once the pre-image has been determined, a remeshing operation is performed so that the resolution of the triangles in the vicinity of the trim curve matches that of the trim curve. Step 519 is then performed.

In step 519, a set T is determined, which contains all triangles in the polygonal mesh which satisfy a refinement criterion (e.g. based on relative chord length) and are intersected by the trim curve.

Next, in step 520, the set T is checked to see if it is empty, and if it is, then the method proceeds to step 522. If the set T is non-empty, the method proceeds to step 521.

In step 521, each triangle in the set T is subdivided using one of the methods described in Section I. After this step is performed, the method returns to step 518 in which the approximate pre-image is recalculated.

In step 522, all triangles wholly within or intersected by the trim region are identified and removed from the polygonal mesh.

Next, in step 523, new triangles are added to the polygonal mesh along the trim curve boundary. In one embodiment, this step is performed using a stitching operation to attach the perimeter of the trimmed mesh to the trim curve pre-image. The new vertices that attach to the trim curve are assigned initial parameter values $u_i^0$ taken locally from the trim curve.

Step 524 is then performed. In step 524, new triangles are identified which contain vertices which should be relaxed to improve the aspect ratios of the newly added triangles. These triangles are placed within the set V, and the vertices of these triangles which should be relaxed are referred to as v.

In step 525, this set is checked to see if it is empty, and if it is, the method proceeds to step 527. If V is not empty, the method proceeds to step 526.

In step 526, the parameter value of each vertex in V is relaxed towards an improved aspect ratio. This is done by selecting the triangle $p_i^0 q^0 r^0$ for each vertex $p_i^0$ in V and estimating the parameter value $\tilde{u}_i^0$ for an isosceles triangle, i.e. $((q^0+r^0)/2-c(\tilde{u}_i^0))\cdot(q^0-r^0)=0$. Then $u_i^0$ is modified to be $(1-\partial)u_i^0+\partial \tilde{u}_i^0$ for step size $\partial$. A loop back is then made to step 524.

In step 527, a set P is created which contains all vertices from the trimmed mesh that are present in the original mesh. Step 528 is then performed.

In step 528, a correspondence is created between each vertex $p_i^k$ in P and a point on the original limit surface.

Step 529 follows step 528. In step 529, a set P is created which contains all vertices from the trimmed mesh that are not present in the original mesh.

Step 530 follows step 529. In step 530, a vertex $p_i^k$ is selected and removed from P. Step 531 is then performed. In step 531, $\overline{p}_i^k$ is determined. It is defined to be the vertex resulting from $p_i^k$ when all detail coefficients $d^j$, $j>0$ are set to zero.

Step 532 follows step 531. In step 532, q, which is the limit point of $\overline{p}_i^k$ on the trimmed limit surface with detail vectors set to zero, is computed.

Step 533 follows step 532. In step 533, $T_i^j$ is determined. $T_i^j$ is the triangle on the trimmed mesh whose limit patch is expected to contain $a_i^j$, the closest point on the original limit surface to q.

Step 534 is then performed. In step 534, $\overline{T}_i^j$, which is the triangle on the trimmed mesh resulting from $T_i^j$ when all detail coefficients $d^j$, $j>0$ are set to zero, is determined.

Step 535 is then performed. In step 535, $\overline{N}_i^j$, the neighborhood of $\overline{T}_i^j$, is determined. The neighborhood of $\overline{T}_i^j$ is the set of triangles (on the trimmed mesh determined when all detail vectors are set to zero) which are incident to a vertex of $\overline{T}_i^j$.

Step 536 follows step 535. In step 536, for each triangle $\overline{T}_k$ in $\overline{N}_i^j$, $r_1$ is determined. In one implementation, $r_1$ is the linear approximation of $\overline{T}_k$ on the original limit surface with all detail vectors ignored. The linear approximation of $\overline{T}_k$ is the triangle whose vertices are the limit points (on the original limit surface with all detail vectors ignored) of the vertices of $\overline{T}_k$.

Step 537 is then performed. In step 537, the triangle $\overline{T}_1$ (on the trimmed mesh with all detail vectors ignored) to which $r_1$ is closest is determined.

Step 538 is then performed. In step 538, $r_1$ is checked to see if the distance between it and q is within a prescribed numeric tolerance. If it is, the method proceeds to step 542. If it is not, the method proceeds to step 539.

In step 539, $\overline{T}_1$ is subdivided. Step 540 follows step 539. In step 540, $\overline{T}_i^{j+1}$, which is the child triangle of $\overline{T}_1$ that contains $r_1$, is computed from the barycentric coordinates of $r_1$ with respect to the linear approximation of $\overline{T}_1$. The barycentric coordinates of a point $r_1$ on the interior of a triangle with vertices $P_1$, $P_2$, and $P_3$ are $a_1$, $a_2$, and $a_3$ where $r_1=a_1*P_1+a_2*P_2+a_3*P_3$ and $a_1+a_2+a_3=1$. If $a_1>0.5$, then $r_1$ lies in the child triangle of $\overline{T}_1$ that corresponds to the vertex $P_1$. Similarly for $P_2$ and $P_3$. If $a_1$, $a_2$ and $a_3$ are all less than 0.5, then $r_1$ lies in the center triangle. If one of $a_1$, $a_2$ or $a_3$ equals 0.5, then $r_1$ lies on an edge between two child triangles, and one of them can be arbitrarily selected.

Step 541 follows step 540. In step 541, $\overline{T}_i^j$ is set to equal $\overline{T}_i^{j+1}$ (so the next iteration of the loop will operate on the newly determined child triangle) and the method loops back to step 535.

In step 542, the point $a_i^j$ is computed by evaluating the original limit surface, including all of its detail coefficients, at the parametric coordinates of $r_1$. The point $a_i^j$ is matched with $p_i^j$.

Step 543 follows step 542. In step 543, the set P is checked to see if it is empty, and if it is, then the method proceeds to step 544. If the set P is non-empty, the method loops back to step 530.

In step 544, a set of triangles T is created which includes all triangles whose corresponding limit patches overlap the region influenced by the trim curve. Letting N(p) denote the set of triangles incident to a control point p, T is initialized with the union of $N(p_i^0)$ for each $p_i^0$ whose connectivity changed through remeshing.

Step 545 follows step 544. In step 545, a set of vertices P is created which includes all vertices which are interior to T. A vertex p is interior to T if its neighboring triangles are elements of T.

Steps 546 and 547 follow step 545. In steps 546 and 547, P is partitioned into two sets, $P_{QI}$ and $P_I$. $P_{QI}$ contains all coarsest level vertices, all interior vertices at finer levels with valence six, and all boundary vertices that are not at a corner. These control points are identified with the predicate $QI(p_i^j)$. $P_I$ contains all other vertices.

Step 548 is then performed. In step 548, $D_{QI}$, which will contain the detail vectors for the vertices in $P_{QI}$, is initialized.

Step 549 follows step 548. In step 549, the appropriate quasi-interpolation stencil is applied to each vertex in $P_{QI}$. Each application of the stencil results in a detail vector, which is stored in $D_{QI}$.

Step 550 follows step 549. In step 550, each detail vector in $D_{QI}$ is added to its corresponding vector in $P_{QI}$.

Step 551 follows step 550. In step 551, $D_f$, which will contain the detail vectors for the vertices in $P_f$, is initialized.

Step 552 is then performed. In step 552, the appropriate interpolation stencil is applied to each vertex in $P_f$. Each application of the stencil results in a detail vector, which is stored in $D_f$.

Step 553 follows step 552. In step 553, each detail vector in $D_f$ is added to its corresponding vertex in $P_f$.

Step 554 follows step 553. In step 554, T, which will contain the set of triangles which still need refinement, is initialized.

Step 555 is then performed. In step 555, a refinement criterion test(t) is applied which assesses the approximation over a single limit patch. In one implementation, test(t) estimates the error using a heuristic. This heuristic approximates the error by measuring it at a few sample points rather than integrating over the entire patch. The sample points used in one implementation are the three vertices of the limit patch and the three additional points along the edges determined by subdividing the limit patch. The heuristic approximates the error by measuring the differences of these six vertices, and t is chosen to be refined if any of these differences exceeds a prescribed threshold $\epsilon$. The chosen limit patches, which do not adequately approximate the original surface, are subdivided. Each child triangle created from these subdivisions and all its neighbors are added to T'.

Step 556 is then performed. In step 556, those triangles that are not adjacent to a child of a triangle in T are removed from T'.

Step 557 follows step 556. In step 557, the set T' is checked to see if it is empty, and if it is, the method ends. If the set T' is non-empty, the method proceeds to step 558.

In step 558, the set T' replaces the set T and the method loops back to step 545.

IV. Related Systems

Figure 10:
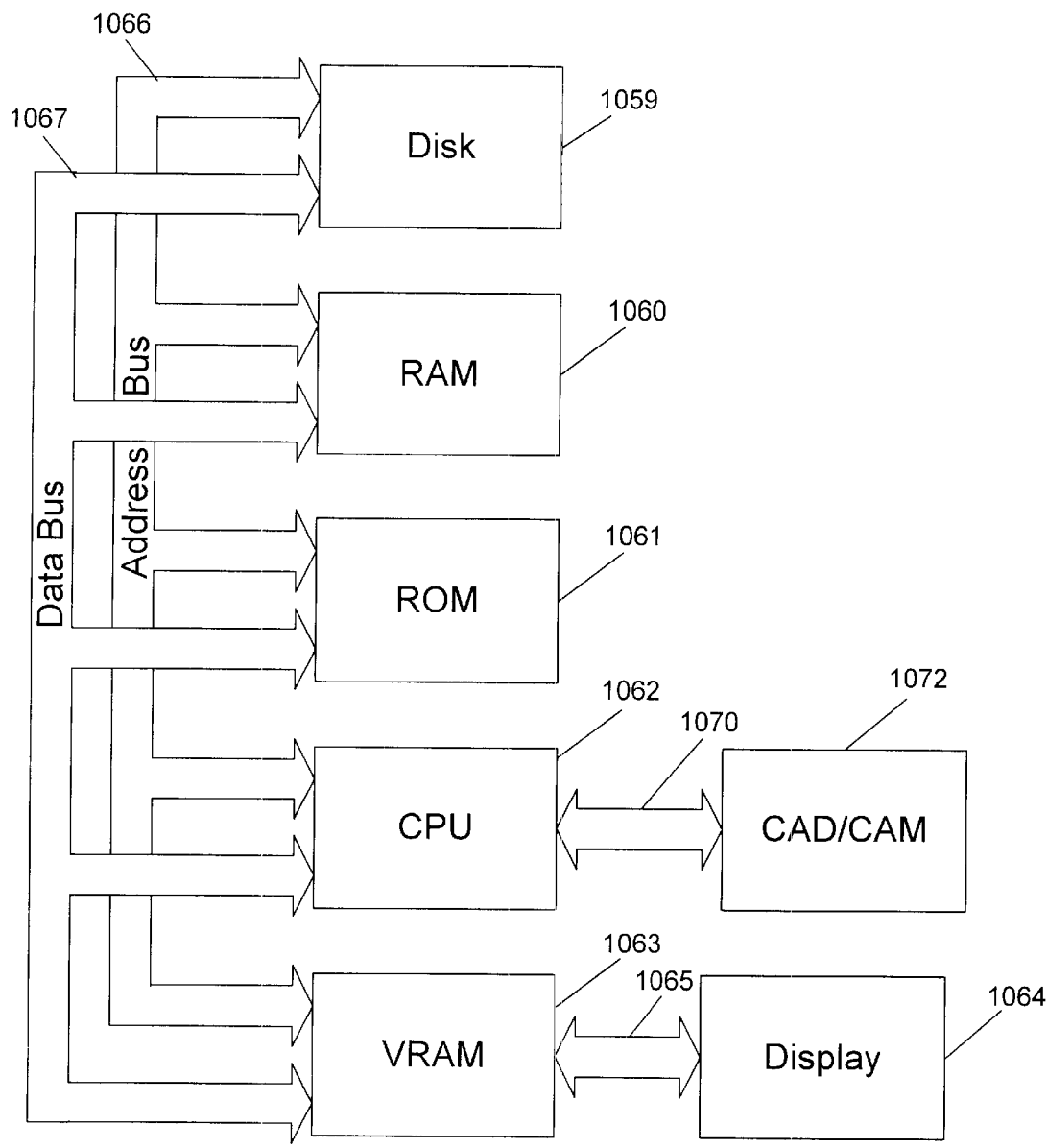
FIG. 10 illustrates one embodiment of a processor-based system for performing any of the foregoing methods.

FIG. 10 illustrates one embodiment of a system according to the invention. As illustrated, the system includes CPU 1062 which can be any processor, including but not limited to a microprocessor, capable of executing software instructions stored in a memory, storage device or other medium accessible or readable by the processor. CPU 1062 is coupled to one or more memories, storage devices or media, including by way of illustration and not limitation, Disk 1059, RAM (Random Access Memory) 1060, ROM (Read Only Memory) 1061, and VRAM (Video RAM) 1063. Other memories or media which may interfaced to the CPU 1062 include CD-ROM, DVD, EPROM, EEPROM, PROM, etc. These memories or media may be coupled to the CPU 1062 through Address Bus 1066 and Data Bus 1067. In addition, VRAM 1063 may be coupled to Display 1064 through Video Bus 1065. In one embodiment, Disk 1059 may function as archival storage, RAM 1060 may function as volatile temporary storage, ROM 1061 may function as non-volatile storage, and VRAM 1063 may function as pixel-mapping memory for Display 1064. By way of illustration only, and not limitation, Disk 1059 may be a hard disk, floppy disk, or compact disk.

In one configuration, software, comprising a series of instructions embodying one of the methods of the subject invention, is stored on Disk 1059. When the system is booted up, the software is loaded into RAM 1060. A section of RAM 1060 may also be allocated to the storage of data or data structures. CPU 1062 is configured to access this software as stored in RAM 1060, and executes it to perform the method in question. CPU 1062 may also update the pixels in VRAM 1063 responsive to the execution of the software. The updated pixels may be displayed on Display 1064.

A Computer Assisted Design or Computer Assisted Manufacture (CAD/CAM) device 1072 may also be interfaced to the CPU 1062 over I/O bus 1070. Device 1072 may provide data or data structures which form inputs to one or more of the methods embodied in the software being executed by CPU 1062. Alternatively, CPU 1062 may output data or data structures to device 1072 over I/O bus 1070.

Figure 11:
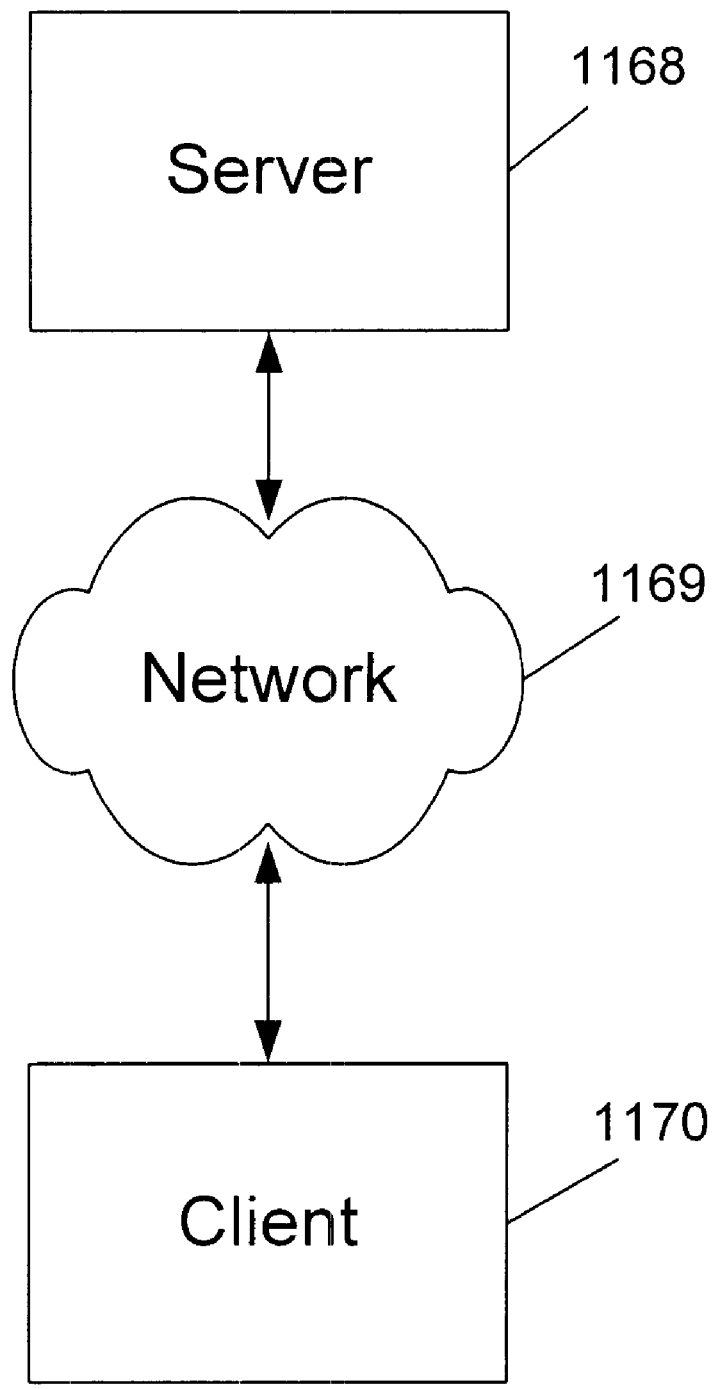
FIG. 11 illustrates one embodiment of a client-server architecture for performing any of the foregoing methods.

FIG. 11 illustrates a second embodiment of a system for performing one or more methods of the subject invention. In this embodiment, a client-server architecture is employed in which a client 1170 accesses a server 1168 over a network 1169, which may be a proprietary network or a public network such as the Internet utilizing a standardized communications protocol such as TCP/IP. In one embodiment, software embodying a method in accordance with the subject invention is maintained on server 1168. Client 1170 issues a request to access this software, and this spawns a request over the network 1169 to access the software maintained on server 1168. In one configuration, to eliminate excessive latency, the software is then copied to client 1170 whereupon it is executed. In order to customize the method to a particular user, the client 1170 may also provide user-specific information as inputs to the software. Either or both of client 1170 and server 1168 may be configured as illustrated in FIG. 10.

In one application, either or both of the systems of FIGS. 10 and 11 may be configured to perform a method of subdividing a surface representation as described in Section I above. In this application, the initial mesh representation of an object may be obtained from a CAD device, or derived from a NURBS representation as provided by a CAD device. The data describing this representation may be stored in one of the memory or media devices maintained on the system. This surface representation may then be subdivided in accordance with the invention. Pixels describing all or a portion of this subdivision representation may be stored in a VRAM and subsequently displayed on a Display. Data descriptive of the subdivided mesh may be output to a CAM device for subsequent manufacture of the object represented by the subdivision representation.

In a second application, either or both of the systems of FIGS. 10 and 11 may be configured to perform a method of determining detail vectors as described in Section II above. In this application, an initial mesh representation of an object may be obtained from a CAD device, or derived from a NURBS representation as provided by a CAD device. The data describing this representation may be stored in one of the memory or media devices maintained on the system. This surface representation may then be augmented with detail vectors determined in accordance with the invention. Pixels describing all or a portion of this augmented surface representation may be stored in a VRAM and subsequently displayed on a Display. Data descriptive of the augmented surface representation may be output to a CAM device for subsequent manufacture of the object represented by the augmented surface representation.

In a third application, either or both of the systems of FIGS. 10 and 11 may be configured to perform a method of trimming a surface representation as described in Section III above. In this application, an initial mesh representation of an object may be obtained from a CAD device, or derived from a NURBS representation as provided by a CAD device.

The data describing this representation may be stored in one of the memory or media devices maintained on the system. A trim curve may be input by a user, and the surface representation then trimmed in accordance with the invention. Pixels describing all or a portion of this trimmed surface representation may be stored in a VRAM and subsequently displayed on a Display. Data descriptive of the trimmed surface representation may be output to a CAM device for subsequent manufacture of the object represented by the trimmed surface representation.

In a fourth application, either or both of the systems of FIGS. 10 and 11 may be configured to perform any combination of one or more of the methods of Sections I, II, and III above.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method of forming detail data corresponding to a first vertex of a polygonal mesh representation of a first object surface, the mesh representation having a limit surface, comprising the following steps:
   forming difference data corresponding to one or more second vertices of the mesh representation and the first vertex, each converging to a limit point on the limit surface, the difference data corresponding to a vertex formed from the difference between a corresponding point on a second object surface and the limit point of the vertex on the limit surface;
   assigning prescribed weights to the vertices;
   weighting the difference data for a vertex with the prescribed weight assigned to that vertex; and
   deriving the detail data for the first vertex from the weighted difference data.

2. The method of claim 1 wherein the first vertex is an interior vertex.

3. The method of claim 2 wherein the mesh representation has one or more levels, and the interior vertex is at an initial level.

4. The method of claim 2 wherein the mesh representation has one or more levels, and the interior vertex is at a level beyond an initial level and has a valence of six.

5. The method of claim 1 wherein the prescribed weights are embodied as a stencil.

6. The method of claim 1 wherein the first vertex is a non-corner boundary vertex.

7. A method of forming detail data corresponding to a first vertex of a polygonal mesh representation of a first object surface, the mesh representation having a limit surface, and the first vertex converging to a limit point on the limit surface, comprising the following steps:
   forming difference data corresponding to the first vertex, the difference data corresponding to the first vertex formed from the difference between a corresponding point on a second object surface and the limit point of the vertex on the limit surface;
   assigning a prescribed weight to the vertex;
   weighting the difference data for the vertex with the prescribed weight assigned to that vertex; and
   deriving the detail data for the first vertex from the weighted difference data.

8. The method of claim 7 wherein first vertex is an internal vertex.

9. The method of claim 8 wherein the mesh representation has one or more levels, and the first vertex is at a level beyond an initial level and has a valance other than six.

10. A method of forming detail data corresponding to a first vertex of a polygonal mesh representation of a first object surface, the mesh representation having a limit surface, comprising the following steps:
    forming difference data corresponding to one or more second vertices of the mesh representation, each converging to a limit point-on the limit surface, the difference data corresponding to a vertex formed from the difference between a corresponding point on a second object surface and the limit point of the vertex on the limit surface;
    assigning prescribed weights to the one or more second vertices;
    weighting the difference data for a second vertex with the prescribed weight assigned to that vertex; and
    deriving the detail data for the first vertex from the weighted difference data.

11. The method of claim 10 wherein the first vertex is a non-corner boundary vertex.

12. The methods of any of claims 1, 7 and 10, wherein the second object surface is the same as the first object surface.

13. The methods of any of claims 1, 7 and 10, wherein the second object surface is different from the first object surface.

14. A method of forming detail data corresponding to a first vertex of a polygonal mesh representation of an object surface, the mesh representation having a limit surface, and the first vertex having a limit point on the limit surface, comprising the following steps:
    assigning prescribed weights to the one or more second vertices of the mesh representation;
    weighting detail data for a second vertex with the prescribed weight assigned to that vertex, the detail data for a vertex relating to the shape of the limit surface at the limit point for the vertex; and
    deriving the detail data for the first vertex from the weighted difference data.

15. The method of claim 14 wherein said forming step comprises forming detail data using any of the methods of claims 1, 7 or 10.

16. The method of claim 14 wherein said first vertex is a corner vertex.

17. The method of claim 14 wherein the prescribed weights are embodied as a stencil.

18. A processor readable medium tangibly embodying the methods of any of claims 1, 7, 10, or 14.

19. A system comprising:
    the processor readable medium of claim 18; and
    a processor configured to perform the method tangibly embodied on the processor readable medium.

20. A client/server system wherein the client or the server comprises the system of claim 19.

21. A memory tangibly embodying the methods of any of claims 1, 7, 10, or 14.

22. A representation of an object surface comprising:
    a mesh representation of the object surface comprising a mesh of polygons, the mesh representation having a corresponding limit surface; and
    detail data corresponding to one or more polygonal vertices each converging to a limit point on the limit surface, the detail data for a vertex relating to the shape of the limit surface near the limit point corresponding to the vertex.

23. The representation of claim 22 wherein the detail data for a vertex relates to the second derivative of the limit surface near the limit point corresponding to the vertex.

24. The representation of claim 22 wherein the mesh representation comprises a mesh of subdivided or repeatedly subdivided polygons.

25. A processor readable medium tangibly embodying the representation of claim 22.

26. A system comprising:

the processor readable medium of claim 25; and a processor configured to access the representation tangibly embodied by the computer readable medium.

27. A client/server system wherein the client or the server comprises the system of claim 26.

28. A memory tangibly embodying the representation of claim 22.

29. A method of forming detail data corresponding to a first vertex of a polygonal mesh representation of an object surface, comprising the following steps:

a step for forming difference data corresponding to one or more second vertices of the mesh representation;

a step for assigning prescribed weights to the one or more second vertices;

a step for weighting the difference data for a vertex with the prescribed weight assigned to that vertex; and a step for deriving the detail data for the first vertex from the weighted difference data.

30. A method of forming detail data corresponding to a first vertex of a polygonal mesh representation of an object surface comprising the following steps:

a step for assigning prescribed weights to one or more second vertices;

a step for weighting detail data for a vertex with the prescribed weight assigned to that vertex; and a step for deriving the detail data for the first vertex from the weighted detail data.

31. A system comprising:

medium means for tangibly embodying any of the methods of claims 29–30; and processor means for performing any of the methods tangibly embodied by the medium means.

32. The methods of any of claims 1, 7, 10, 29 and 30, wherein the first vertex is a second vertex.

33. The methods of any of claims 1, 7, 10, 29 and 30, wherein the first vertex is different from the one or more second vertices.

34. A representation of an object surface comprising:

mesh representation means for representing the object surface through a mesh of polygons; and detail data means for representing the shape of a limit surface corresponding to the mesh representation means.

35. A system comprising:

medium means for tangibly embodying the surface representation of claim 34; and processor means for accessing the surface representation tangibly embodied by the medium means.

* * * * *